United States Patent
Wang et al.

(10) Patent No.: US 11,178,378 B2
(45) Date of Patent: Nov. 16, 2021

(54) SIGNALING OF SPATIAL RESOLUTION OF DEPTH VIEWS IN MULTIVIEW CODING FILE FORMAT

(71) Applicant: QUALCOMM Incorporated, San Diego, CA (US)

(72) Inventors: Ye-Kui Wang, San Diego, CA (US); Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/917,476

(22) Filed: Jun. 30, 2020

(65) Prior Publication Data

US 2020/0336726 A1   Oct. 22, 2020

Related U.S. Application Data

(63) Continuation of application No. 14/137,358, filed on Dec. 20, 2013, now Pat. No. 10,791,315.

(Continued)

(51) Int. Cl.
*H04N 7/18* (2006.01)
*H04N 13/161* (2018.01)
(Continued)

(52) U.S. Cl.
CPC ............. *H04N 13/161* (2018.05); *H04N 5/76* (2013.01); *H04N 5/919* (2013.01);
(Continued)

(58) Field of Classification Search
CPC .................................................. H04N 13/161
(Continued)

(56) References Cited

U.S. PATENT DOCUMENTS 6,362,901 B1 * 3/2002 Passman .................. H04N 1/40
358/453
8,570,320 B2   10/2013 Izadi et al.
(Continued)

FOREIGN PATENT DOCUMENTS

CN       102257818 A      11/2011
CN       101292538 B      11/2012
(Continued)

OTHER PUBLICATIONS

Payman Aflaki, et al., "MVC+D: coding of unpaired MVD data", 2.JCT-3V Meeting, Oct. 13, 2012-Oct. 19, 2012, Shanghai, (The Joint Collaborative team on 3D Video Coding Extension Development of ISO/IEC JTC1/SC29/WG11 and ITU-T SG.16 ), No. JCT3V-B0147, Oct. 10, 2012 (Oct. 10, 2012), XP030130328, Retrieved from the Internet: URL: http://phenix.int-evry.fr/jct2/doc_end_user/documents/2_Shanghai/wg11/JCT3V-B0147-v1.zipJCT3V_B0147_unpaired-MVD.doc, [retrieved on Jan. 13, 2014].

(Continued)

*Primary Examiner* — Leron Beck
(74) *Attorney, Agent, or Firm* — Campbell C. Chiang; Shumaker & Sieffert, P.A.

(57) ABSTRACT

Techniques for encapsulating video streams containing multiple coded views in a media file are described herein. In one example, a method includes parsing a track of multiview video data, wherein the track includes at least one depth view. The method further includes parsing information to determine a spatial resolution associated with the depth view, wherein decoding the spatial resolution does not require parsing of a sequence parameter set of the depth view. Another example method includes composing a track of multiview video data, wherein the track includes the one or more views. The example method further includes composing information to indicate a spatial resolution associated with the depth view, wherein decoding the spatial resolution (Continued)

does not require parsing of a sequence parameter set of the depth view.

46 Claims, 11 Drawing Sheets

Related U.S. Application Data

(60) Provisional application No. 61/749,089, filed on Jan. 4, 2013.

(51) Int. Cl.
| | | |
|---|---|---|
| *H04N 19/70* | (2014.01) | |
| *H04N 5/76* | (2006.01) | |
| *H04N 9/804* | (2006.01) | |
| *H04N 19/597* | (2014.01) | |
| *H04N 19/46* | (2014.01) | |
| *H04N 9/82* | (2006.01) | |
| *H04N 5/919* | (2006.01) | |
| *H04N 19/44* | (2014.01) | |
| *H04N 5/765* | (2006.01) | |

(52) U.S. Cl.
CPC ......... *H04N 9/8042* (2013.01); *H04N 9/8205* (2013.01); *H04N 19/44* (2014.11); *H04N 19/46* (2014.11); *H04N 19/597* (2014.11); *H04N 19/70* (2014.11); *H04N 5/765* (2013.01)

(58) Field of Classification Search
USPC .......................................................... 348/43
See application file for complete search history.

(56) References Cited

U.S. PATENT DOCUMENTS

| | | | |
|---|---|---|---|
| 8,976,871 B2 | 3/2015 | Chen et al. | |
| 9,185,439 B2 | 11/2015 | Chen et al. | |
| 9,225,961 B2 | 12/2015 | Chen et al. | |
| 9,236,091 B2* | 1/2016 | Doehla ............ | H04N 21/23895 |
| 9,357,199 B2 | 5/2016 | Wang et al. | |
| 9,584,792 B2 | 2/2017 | Wang et al. | |
| 9,648,299 B2 | 5/2017 | Wang et al. | |
| 10,097,841 B2* | 10/2018 | Hendry ................ | H04N 19/188 |
| 2005/0235221 A1* | 10/2005 | Asoh ...................... | G06F 3/1431 |
| | | | 715/789 |
| 2006/0088211 A1 | 4/2006 | Kusakabe et al. | |
| 2007/0016594 A1* | 1/2007 | Visharam ............... | H04N 19/30 |
| 2007/0183675 A1 | 8/2007 | Morohashi | |
| 2008/0123738 A1 | 5/2008 | Katsavounidis et al. | |
| 2008/0310762 A1* | 12/2008 | Lee ...................... | H04N 13/139 |
| | | | 382/305 |
| 2009/0003714 A1 | 1/2009 | Subramaniam | |
| 2009/0199100 A1 | 8/2009 | Hwang et al. | |
| 2010/0098157 A1 | 4/2010 | Yang | |
| 2010/0153395 A1 | 6/2010 | Hannuksela et al. | |
| 2010/0161686 A1* | 6/2010 | Yun ...................... | H04N 13/161 |
| | | | 707/812 |
| 2010/0171812 A1 | 7/2010 | Kim et al. | |
| 2010/0272417 A1 | 10/2010 | Nagasawa et al. | |
| 2011/0002594 A1* | 1/2011 | Kim ..................... | H04N 13/178 |
| | | | 386/248 |
| 2011/0216833 A1 | 9/2011 | Chen et al. | |
| 2011/0243233 A1* | 10/2011 | Alshina ................ | H04N 19/533 |
| | | | 375/240.16 |
| 2011/0280311 A1 | 11/2011 | Chen et al. | |
| 2011/0298895 A1 | 12/2011 | Tian et al. | |
| 2011/0304618 A1 | 12/2011 | Chen et al. | |
| 2012/0044322 A1 | 2/2012 | Tian et al. | |
| 2012/0140819 A1 | 6/2012 | Kim et al. | |
| 2012/0219069 A1 | 8/2012 | Lim et al. | |
| 2012/0229602 A1 | 9/2012 | Chen et al. | |
| 2012/0269261 A1 | 10/2012 | Choi et al. | |
| 2013/0002816 A1 | 1/2013 | Hannuksela et al. | |
| 2013/0113882 A1 | 5/2013 | Haque et al. | |
| 2013/0136176 A1 | 5/2013 | Chen et al. | |
| 2013/0182760 A1* | 7/2013 | Sasai .................... | H04N 19/523 |
| | | | 375/240.02 |
| 2013/0215219 A1 | 8/2013 | Hefeeda et al. | |
| 2013/0235152 A1* | 9/2013 | Hannuksela ........... | H04N 19/70 |
| | | | 348/43 |
| 2014/0098189 A1 | 4/2014 | Deng et al. | |
| 2014/0168362 A1 | 6/2014 | Hannuksela et al. | |
| 2014/0192151 A1 | 7/2014 | Wang et al. | |
| 2014/0192152 A1 | 7/2014 | Wang et al. | |
| 2014/0192153 A1 | 7/2014 | Wang et al. | |
| 2014/0192165 A1 | 7/2014 | Norkin et al. | |
| 2014/0193139 A1 | 7/2014 | Wang et al. | |
| 2015/0201178 A1* | 7/2015 | Lakshminarayanan ..................... | |
| | | | H04N 13/161 |
| | | | 348/43 |
| 2015/0245063 A1 | 8/2015 | Rusanovskyy et al. | |
| 2017/0134708 A1 | 5/2017 | Wang et al. | |

FOREIGN PATENT DOCUMENTS

| | | |
|---|---|---|
| JP | 2009513074 A | 3/2009 |
| JP | 2010522494 A | 7/2010 |
| JP | 2010530160 A | 9/2010 |
| JP | 2010258872 A | 11/2010 |
| JP | 2011511593 A | 4/2011 |
| JP | 2011528868 A | 11/2011 |
| JP | 2012518367 A | 8/2012 |
| TW | 201234261 A | 8/2012 |
| WO | 2007047736 A2 | 4/2007 |
| WO | 2008150111 A1 | 12/2008 |
| WO | 2010007513 A1 | 1/2010 |
| WO | 2011035211 A2 | 3/2011 |
| WO | 2011143599 | 11/2011 |
| WO | 2012009700 A1 | 1/2012 |
| WO | 2012012575 A1 | 1/2012 |
| WO | 2012122364 A1 | 9/2012 |

OTHER PUBLICATIONS

3GPP TS 26.244 V9.1.0, 3rd Generation Partnership Project; Technical Specification Group Services and System Aspects; Transparent end-to-end packet switched streaming service (PSS); 3GPP file format (3GP), (Release 9), Mar. 2010, 55 pp.

Anonymous: "Text of ISO/IEC 14496-12 4th edition", 100. MPEG Meeting; Apr. 30, 2012-May 4, 2012; Geneva; (Motion Picture Expert Group or ISO IIEC JTC1/SC29/WG11), No. N12640, Jun. 7, 2012 (Jun. 7, 2012), XP030019114.

Anonymous: "Text of ISO/IEC 14496-15:2010/DAM 2 Carriage of HEVC", 102, MPEG Meeting; Oct. 15, 2012-Oct. 19, 2012; Shanghai; (Motion Picture Expert Group or ISO/IEC JTC1/SC29/WG11), No. N13036, Nov. 5, 2012 (Nov. 5, 2012), 27 Pages, XP030019506, the whole document.

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.

Bross B., et al., "High Efficiency Video Coding (HEVC) text specification draft 10 (for FDIS & Consent)," Joint Collaborative Team on Video Coding (JCT-VC) of ITU-T SG 16 WP 3 and ISO/IEC JTC 1/SC 29/WG 11, Document JCTVC-L1003_v34, 12th Meeting: Geneva, CH, Jan. 14-23, 2013, 310 pages.

Bross B., et al., "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, 259 Pages, pp. 1-7, 34, 54-55, 74-75, 90-98, 220-224, URL: http://wftp3.itu.int/AV-ARCH/JCTVC-SITE/.

Bross B., et al., "High Efficiency Video Coding (HEVC) Text Specification Draft 7," JCTVC-I1003 d2, 9. JCT-VC Meeting; 100. MPEG Meeting; Apr. 27, 2012-May 7, 2012; Geneva; (Joint Collaborative Team on Video Coding of ISO/IEC JTC1/SC29/WG11

(56) References Cited

OTHER PUBLICATIONS and ITU-T SG.16 ); URL: http://wftp3.1tu.int/av-arch/jctvc-site/, No. JCTVC-I1003, May 10, 2012 (May 10, 2012), XP030112373, 290 pages.
Bross B., et al., "High Efficiency Video Coding (HEVC) Text Specification Draft 8", Jul. 11-20, 2012, 10. JCT-VC Meeting, 101. MPEG Meeting, Stockholm; (Joint Collaborative Team on Video Coding of ISO/IEC JTC1/SC29/WG11 and ITU-T SG.16); URL: http://wftp3.itu.int/av-arch/jctvc-site/,, No. JCTVC-J1003_d7, XP030112947, pp. 197-201, section A.4.1 ,A.4.2, 260 Pages.
Bross., et al., "High Efficiency Video Coding (HEVC) Text Specification Draft 9," Joint Collaborative Team on Video Coding (JCT-VC) of ITU-T SG16 WP3 and ISO/IEC JTC1/SC29/WG11, JCTVC-K1003_v11, 11th Meeting: Shanghai, CN, Oct. 10-19, 2012, 311 pages.
Bross, et al., "High Efficiency Video Coding (HEVC) Text Specification Draft 9", Joint Collaborative Team on Video Coding (JCT-VC) of ITU-T SG16 WP3 and ISO/IEC JTC1/SC29/WG11, JCTVC-K1003_v7, 11th Meeting: Shanghai, CN, Oct. 10-19, 2012 , 290 pp.
Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pp.
Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.
Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16); URL: http://phenix.int-evry.fr/jvet/ ,, No. JVET-A1001 Feb. 24, 2016 (Feb. 24, 2016), XP030150000, 27 pages.
CN Application No. 201380069185.5 First Office Action dated Sep. 26, 2017.
Gruneberg K., et al., "Deliverable D3.2 MVC/SVC Sorage Format", Information and Communication Technologies (ICT) Programme No. FP7-ICT-214063, Jan. 29, 2009 (Jan. 29, 2009), pp. 1-34, XP002599508 Retrieved from the Internet: URL: http://www.ist-sea.eu/Public/SEA_D3.2_HHIFF_20090129.pdf [retrieved on Sep. 1, 2010] paragraph [02.3].
Hannuksela M.M., et al., "3D-AVC Draft Text 4," Joint Collaborative Team on 3D Video Coding Extension Development of ITU-T SG 16 WP 3 and ISO/IEC JTC 1/SC 29/WG 11, 2nd meeting: Shanghai, CN, Oct. 13-19, 2012, Document JCT3V-B1002, 75 pages.
Information technology—Coding of audio-visual objects—Part 15: Advanced Video Coding (AVC) file format, Amendment 2: Carriage of high-efficiency video coding (HEVC), ISO/IEC JTC 1/SC 29 N, ISO/IEC 14496-15:2010/PDAM 2, ISO/IEC JTC 1/SC 29/WG 11, (30) Committee, May 9, 2012, 17 pages.
"Information technology—Coding of audio-visual objects—Part 15: Carriage of NAL unit structured video in the ISO Base Media File Format", 183, MPEG Meeting; Jan. 21, 2013-Jan. 25, 2013; Geneva; (Motion Picture Expert Group or ISO/IEC JTC1/SC29/WG11), No. m27591, Jan. 8, 2013 (Jan. 8, 2013), 118 Pages, XP55167403, the whole document.
"Information Technology—Coding of Audio-Visual Objects—Part 15: Carriage of NAL Unit Structured video in the ISO Base Media File Format," ISO/IEC 14496-15:2010(E), Third Edition, 2012, 102 Pages.
International Preliminary Report on Patentability—PCT/US2013/077587, The International Bureau of WIPO—Geneva, Switzerland, dated Dec. 14, 2015.
International Search Report and Written Opinion—PCT/US2013/077587—ISA/EPO—dated Feb. 25, 2015.
International Standard ISO/IEC 14496-12, Information Technology—Coding of audio-visual objects—Part 12: ISO base media file format, Third Edition, Oct. 15, 2008, 120 pp.

"ISO/IEC 14496-15:2010 Information technology—Coding of audio-visual objects—Part 15: Advanced Video Coding (AVC) file format", International Standard ISO/IEC, vol. 14496-15, Jun. 1, 2010 (Jun. 1, 2010), pp. 1-96.
ITU-T H.264, Series H: Audiovisual and Multimedia Systems, Infrastructure of audiovisual services—Coding of moving video, Advanced video coding for generic audiovisual services, The International Telecommunication Union. June 2011, 674 pp.
ITU-T H.265, "Series H: Audiovisual and Multimedia Systems, Infrastructure of Audiovisual Services—Coding of Moving Video, High efficiency Video Coding," The International Telecommunication Union, Dec. 2016, 664 Pages.
ITU-T H.265, Series H: Audiovisual and Multimedia Systems, Infrastructure of Audiovisual Services—Coding of Moving Video, High Efficiency Video Coding, The International Telecommunication Union, Apr. 2013, 317 Pages.
"ITU-T H.265, Series H: Audiovisual and Multimedia Systems, Infrastructure of audiovisual services—Coding of moving video, High efficiency video coding," The International Telecommunication Union, Apr. 2015, 634 pp, please consider section 7.4.9.6 on p. 102, section 8.5.3.2.6 on p. 141, section 8.5.3.2.7 on pp. 141-145, and section 8.5.3.2.8 on p. 145.
ITU-T H.265, Series H: Audiovisual and Multimedia Systems, Infrastructure of audiovisual services—Coding of moving video, High efficiency video coding, The International Telecommunication Union, Oct. 2014, 540 pp.
Lee, et al., "A Fast and Efficient Multi-View Depth Image Coding Method Based on Temporal and Inter-View Correlations of Texture Images," IEEE Circuits and Systems Society, IEEE Transactions on Volume: Circuits and Systems for Video Technology, May 2011, pp. 1-11.
"Part 14: MP4 file format," Information technology—Coding of audio-visual objects, ISO/IEC 14496-14, Nov. 15, 2003, 18 pp.
"Part 15: Carriage of network abstraction layer (NAL) unit structured video in ISO base media file format," Information technology—Coding of audio visual objects, ISO/IEC 14496-15, Jul. 1, 2014, 124 pp.
Rusanovskyy D. et al., "White Paper on State of the Art in 3D Video (Draft 2)," 1.JCT-3V Meeting, 101. MPEG Meeting, Jul. 16, 2012-Jul. 20, 2012, Stockholm, (The Joint Collaborative Team on 3D Video Coding Extension Development of ISO/IEC JTC1/SC29/WG11 and ITU-T SG.16), URL: http://phenix.int-evry.fr/jct2/,, No. JCT2-A1006, Aug. 6, 2012 (Aug. 6, 2012), XP030130184, Section "Stereoscopic and Multiview Video" pp. 1-14.
Second Written Opinion from International Application No. PCT/US2013/077587, dated Jul. 17, 2015, 7 pp.
Second Written Opinion from International Application No. PCT/US2013/077587, dated Oct. 13, 2015, 4 pp.
Suzuki T., et al., "Study Text of ISO/IEC 14496-10:2012/DAM2 MVC extension for inclusion of depth maps," ISO/IEC JTC1/SC29/WG11 MPEG2012/N13140, Shanghai, China, Oct. 2012, 76 pp.
Taiwan Search Report—TW103100243—TIPO—dated Oct. 28, 2015.
Tech, et al., "MV-HEVC Working Draft 2," Document: JCT3V-B1004_d0, Joint Collaborative Team on 3D Video Coding Extension Development, of ITU-T SG 16 WP 3 and ISO/IEC JTC 1/SC 29/WG 11, 2nd Meeting: Shanghai, CN , Oct. 13-19, 2012, 22 pages.
Tech G., et al., "3D-HEVC Test Model 2," Joint Collaborative Team on 3D Video Coding Extension Development of ITU-T SG 16 WP 3 and ISO/IEC JTC 1/SC 29/WG 11, Document: JCT3V-B1005_d0, 2nd Meeting: Shanghai, CN, Oct. 13-19, 2012, 118 pages, XP030130414, URL: https://phenix.int-evry.fr/jct2, Dec. 2012 (Dec. 23, 2012).
"Text of ISO/IEC 14496-12 4th edition" Part 12: ISO base media file format, MPEG Meeting; Nov. 2008 Geneva; (Motion Picture Expert Group or ISOIIEC JTC1/SC29/WG11), 190 pp.
"Text of ISO/IEC 14496-15:2010/DAM 2 Carriage of HEVC", 102, MPEG Meeting; Oct. 15, 2012-Oct. 19, 2012; Shanghai; (Motion Picture Expert Group or ISO/IEC JTC1/SC29/WG11), No. N13036, Nov. 5, 2012 (Nov. 5, 2012), 27 Pages, XP030021271, the whole document.

(56) References Cited

OTHER PUBLICATIONS

Wang Y.K., et al., "A proposal of MVC+D file format", 103, MPEG Meeting; Jan. 21, 2013-Jan. 25, 2013; Geneva (Motion Picture Expert Group or ISO/IEC JTC1/SC29/WG11 ), No. m27591, Jan. 8, 2013 (Jan. 8, 2013), 2 Pages, XP030056156, the whole document.

Wang Z., et al., "Depth Template based 2D-to-3D Video Conversion and Coding System," IEEE International Conference on Multimedia and Expo, Dec. 31, 2012, pp. 308-313.

"WD of ISO/IEC 14496-15:2013 AMD 1 Support of MVC with depth information", 105, MPEG Meeting;Jul. 29, 2013-Aug. 2, 2013; Vienna; (Motion Picture Expert Group or ISO/IEC JTC1/SC29/WG11), No. N13669, Aug. 2, 2013 (Aug. 2, 2013), 56 Pages, XP030020417, the whole document.

Wiegand T., et al., "WD3: Working Draft 3 of High-Efficiency Video Coding", Joint Collaborative Team on Video Coding (JCT-VC) of ITU-T SG16 WP3 and ISO/IEC JTC1/SC29/WG11, XP030009014, Document JCTVC-E603, 5th Meeting, Geneva, CH, Mar. 16-23, 2011, 16 Pages.

Wiegand, T., et al., "WD2: Working Draft 2 of High-Efficiency Video Coding", Jan. 28, 2011, No. JCTVC-D503, Jan. 28, 2011 (Jan. 28, 2011), XP002679642, Retrieved from the Internet: URL: http://wftp3.itu.int/av-arch/jctvc-site/2011_01_D_Daegu/ [retrieved on Jul. 11, 2012], 153 pp.

Wiegand T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010, 137 pp.

Zhang R., et al., "Adaptive Depth edge sharpening for 3D video depth coding", Visual Communications and Image Processing (VCIP), 2012.

European Search Report—EP21166332—Search Authority—Berlin—dated Jul. 8, 2021.

* cited by examiner

SIGNALING OF SPATIAL RESOLUTION OF DEPTH VIEWS IN MULTIVIEW CODING FILE FORMAT

CLAIM OF PRIORITY

This application is a Continuation of U.S. application Ser. No. 14/137,358, filed on Dec. 20, 2013, which claims the benefit of U.S. Provisional Application No. 61/749,089, filed on Jan. 4, 2013, the entire content each of which is incorporated herein by reference.

TECHNICAL FIELD

This disclosure relates to video coding and storing video content and more particularly to techniques for storing video streams containing multiple coded views.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, transcoders, routers or other network devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, proprietary standards, open video compression formats such as VP8, and extensions of such standards, techniques or formats. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be divided into video blocks, which may also be referred to as macroblocks, treeblocks, coding units (CUs) and/or coding nodes. The video blocks may themselves be sub-divided, e.g., into smaller video blocks or partitions, and the partitions may be further sub-divided. For example, macroblocks may be sub-divided into smaller video blocks, often referred to as partitions, and some of the partitions may be sub-divided into even smaller video blocks.

Video blocks coded in an intra (I) mode may be encoded using spatial prediction with respect to reference samples in neighboring blocks in the same picture. Video blocks coded in an inter mode (e.g., predictive (P) or bi-predictive (B) mode) may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure relates to various techniques for storing video data. In particular, this disclosure describes technique for storing video streams containing multiple coded views.

In one example of the disclosure, a method of processing video data is described. The method includes parsing a track of multiview video data, wherein the track includes at least one depth view. The method further includes parsing information to determine a spatial resolution associated with the depth view, wherein decoding the spatial resolution does not require parsing of a sequence parameter set of the depth view.

In another example, a device for processing video data comprising one or more processors is described. The one or more processors are configured to parse a track of multiview video data, wherein the track includes one or more views, including at least one depth view. The one or more processors is further configured to parse information to determine a spatial resolution associated with the depth view, wherein decoding the spatial resolution does not require parsing of a sequence parameter set of the depth view.

A non-transitory computer-readable storage medium having instructions stored thereon is also described. Upon execution, the instructions cause one or more processors of a video coding device to parse a track of multiview video data, wherein the track includes one or more views, including at least one depth view. Executing the instructions further causes the one or more processors of a video coding device to parse information to determine a spatial resolution associated with the depth view, wherein decoding the spatial resolution does not require parsing of a sequence parameter set of the depth view.

In another example, an apparatus configured to parse a video file including coded video content is described. The apparatus includes means for parsing a track of multiview video data, wherein the track includes one or more views, including at least one depth view. The apparatus further includes means for parsing information to determine a spatial resolution associated with the depth view, wherein decoding the spatial resolution does not require parsing of a sequence parameter set of the depth view.

In another example, a method of processing video data is described. The method includes composing a track of multiview video data, wherein the track includes the one or more views and composing information to indicate a spatial resolution associated with the depth view, wherein decoding the spatial resolution does not require parsing of a sequence parameter set of the depth view.

In another example, a device for processing video data including one or more processors. The one or more processors are configured to compose a track of multiview video data, wherein the track includes one or more views, including at least one depth view. The one or more processors is further configured to compose information to indicate a spatial resolution associated with the depth view, wherein decoding the spatial resolution does not require parsing of a sequence parameter set of the depth view.

A non-transitory computer-readable storage medium having instructions stored thereon is also described. Upon execution, the instructions cause one or more processors of a video coding device to compose a track of multiview video data, wherein the track includes one or more views, including at least one depth view. Executing the instructions further causes the one or more processors of a video coding device to compose information to indicate a spatial resolution associated with the depth view, wherein decoding the spatial resolution does not require parsing of a sequence parameter set of the depth view.

In another example, an apparatus configured to parse a video file including coded video content is described. The apparatus includes means for composing a track of multiview video data, wherein the track includes one or more views, including at least one depth view. The apparatus further includes means for composing information to indicate a spatial resolution associated with the depth view, wherein decoding the spatial resolution does not require parsing of a sequence parameter set of the depth view.

The details of one or more examples are set forth in the accompanying drawings and the description below. Other features, objects, and advantages will be apparent from the description and drawings, and from the claims.

DETAILED DESCRIPTION

Figure 1:
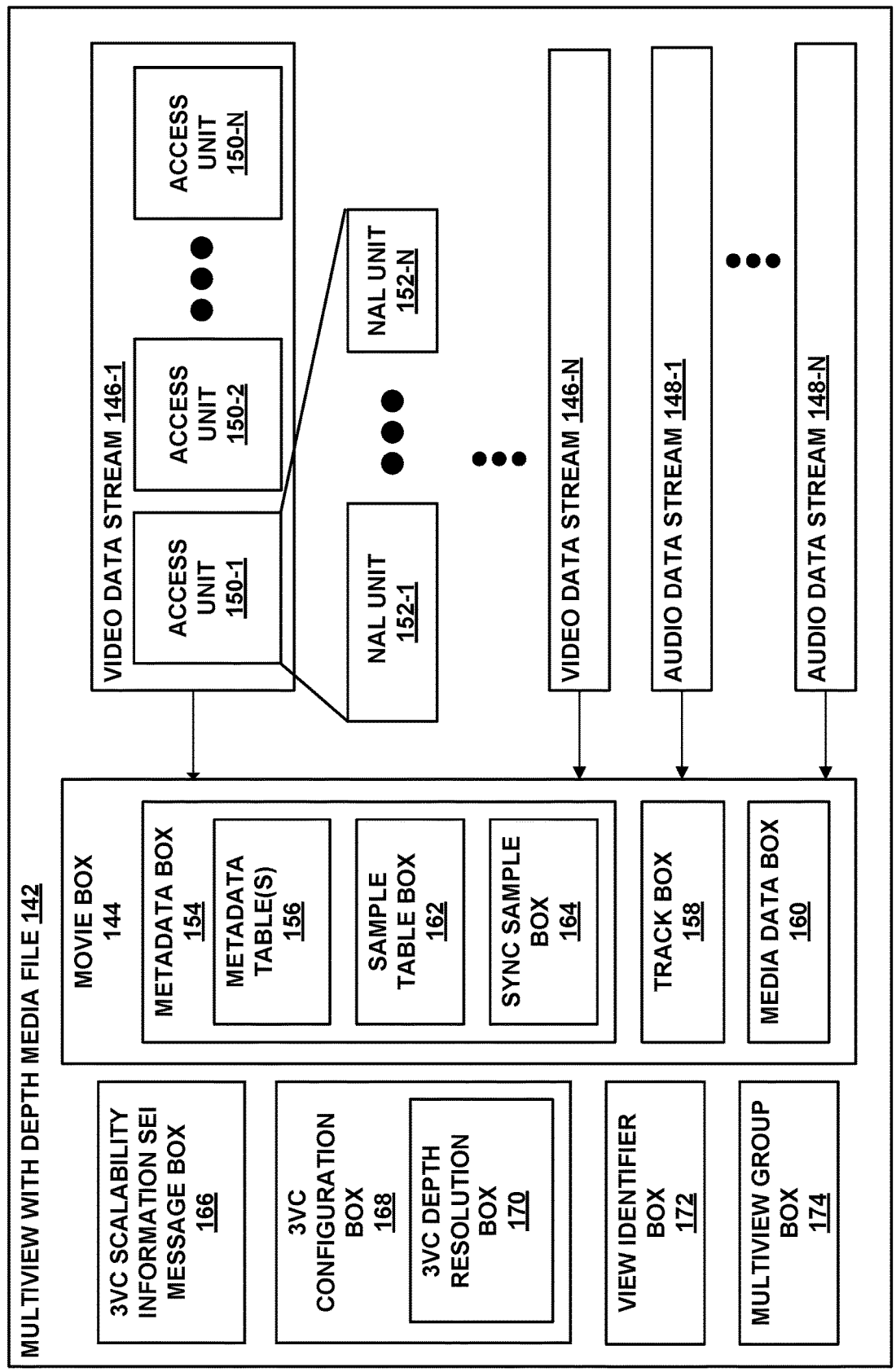
FIG. 1 is a conceptual diagram illustrating the structure of an example MVC+D media file that may be generated according to the techniques described in this disclosure.

In general, this disclosure relates to encapsulating and decapsulating video content and storing the coded video content in a file. This disclosure describes various techniques for storing video content including, for example, storing video content coded according to the HEVC video standard in a file based on an International Organization for Standardization (ISO) based media file format (ISOBMFF). In particular, this disclosure describes techniques for encapsulating video streams containing multiple coded views in a media file. Throughout this disclosure, the term "media file" may be used interchangeably with "video file." Various methods are disclosed herein for composing and parsing video streams containing multiple coded views, wherein each view may contain a texture view only, a depth view only, or both texture and depth views, in a file based on ISOBMFF.

Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, there is a new video coding standard, namely High-Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG). A recent working Draft (WD) of HEVC is entitled "High Efficiency Video Coding (HEVC) text specification draft 9," (referred to herein as "HEVC Working Draft 9" or "HEVC WD9,") is described in document JCTVC-K1003_v11, Bross et al., Joint Collaborative Team on Video Coding (JCT-VC) of ITU-T SG16 WP3 and ISO/IEC TJC1/SC29/WG11, 11$^{th}$ Meeting, Shanghai, China, 10-19 Oct. 2012, is available from http://phenix.int-evry.fr/jct/doc_end_user/documents/11_Shanghai/wg11/JCTVC-K1003-v11.zip.

Various AVC and HEVC extensions are also under development in JCT-3V and JCT-VC. In JCT-3V, two HEVC extensions, the multiview extension (MV-HEVC) and 3D video extension (3D-HEVC), are being developed. In addition, two AVC extensions, the MVC+D and the 3D-AVC, are being developed.

Recent versions of the ongoing standards are as follows. Document JCT3V-B1001, entitled "Study Text of ISO/IEC 14496-10:2012/DAM2 MVC extension for inclusion of depth maps," by M. Hannuksela (Nokia), Y. Chen (Qualcomm), G. Sullivan (Microsoft), T. Suzuki, S. Hattori (Sony), dated October 2012 and available at http://phenix.it-sudparis.eu/jct2/doc_end_user/documents/2_Shanghai/wg11/JCT3V-B1001-v1.zip. This is also referred to as MVC+D or three-dimensional video coding (3VC), and the coded video may be referred to as three-dimensional video (3DV). Three-dimensional video coding may also be referred to as three-dimension video coding. Document JCT3V-B1002, entitled "3D-AVC draft text 4," by M. M. Hannuksela, Y. Chen, T. Suzuki, J.-R. Ohm, G. J. Sullivan, and available at http://phenix.it-sudparis.eu/jct2/doc_end_user/documents/2_Shanghai/wg11/JCT3V-B1002-v1.zip. Document JCT3V-B1004, entitled "MV-HEVC Draft Text 2," by G. Tech, K. Wegner, Y. Chen, M. Hannuksela, and available at http://phenix.it-sudparis.eu/jct2/doc_end_user/documents/2_Shanghai/wg11/JCT3V-B1004-v1.zip. Document JCT3V-B1005, entitled "3D-HEVC Test Model 2," by G. Tech, K. Wegner, Y. Chen, S. Yea, and available at http://phenix.it-sudparis.eu/jct2/doc_end_user/documents/2_Shanghai/wg11/JCT3V-B1005-v1.zip.

This disclosure relates to storing of video content in an electronic data file. To store video content coded according to a particular video standard, a file format specification corresponding to the particular video standard may be helpful. In particular, this document discloses various methods for the storing of video streams containing multiple coded views, wherein each view may contain a texture view only, a depth view only, or both, in a file based on ISO base media file format (ISOBMFF). In various ones of the coding extensions standards, multiple views or layers may be present. Furthermore, different layers, texture or depth views may have different spatial resolutions. Techniques for encapsulation of encoded video into a file are described, and techniques for decapsulation of the file to retrieve the encoded video content are also described.

File format standards include ISO base media file format (ISOBMFF, ISO/IEC 14496-12) and other formats derived from the ISOBMFF, including MPEG-4 file format (ISO/IEC 14496-14), 3rd Generation Partnership Project (3GPP) file format (3GPP TS 26.244), and AVC file format (ISO/IEC 14496-15). The ISOBMFF can be used as the basis for many encoder-decoder (codec) encapsulation formats, such as the AVC File Format, as well as for many multimedia container formats, such as the MPEG-4 File Format, the 3GPP File Format (3GP), and the DVB File Format.

The HEVC file format uses the ISOBMFF as the basis for its encapsulation format. The latest draft of the HEVC file format (referred to herein as "HEVCFF") is defined according to ISO/IEC 14496-15:2010/Amd.1:2011(E) and includes the following normative reference: ISO/IEC 14496-15, Information Technology—Coding of audio-visual objects—Part 15: Carriage of NAL unit structured video in the ISO based media file format (i.e., ISOBMFF).

The ISOBMFF is used as the basis for many video coding standard encapsulation formats, as well as for many multimedia container formats. Examples of other file formats based on the ISOBMFF include, for example, the MPEG-4 file format (ISO/IEC 14496-14), the 3GPP file format (3GPP TS 26.244) and AVC file format (ISO/IEC 14496-15) (i.e., AVCFF). Further, it should be noted that although the techniques disclosed herein are described in some examples with respect to HEVC and may reference particular file formats, they may be equally applicable to other video coding standards and file formats.

In addition to continuous media (such as, for example, audio and video), static media (such as, for example, images) as well as metadata can be stored in a file conforming to ISOBMFF. Files structured according to the ISOBMFF may be used for many purposes, including local media file playback, progressive downloading of a remote file, segments for Dynamic Adaptive Streaming over Hypertext Transfer Protocol (HTTP) (DASH), containers for content to be streamed and its packetization instructions, and recording of received real-time media streams. In general, the ISOBMFF allows continuous media data, such as audio and video data, to be stored independently from metadata. In one example, media data may include a group of pictures coded according to HEVC. Metadata typically includes presentation and timing information such that portions of media data are independently decodable.

ISOBMFF uses an object-oriented based scheme in which elementary syntax elements are used as building blocks to form a media file. In ISOBMFF, these elementary syntax elements are referred to as "boxes." However, specific file formats based on ISOBMFF may refer to boxes using different terminology, such as "atoms." Further, it should be noted, that when describing specific file formats based on ISOBMFF, specific terminology may often be used interchangeably with HEVCFF terminology in a non-limiting manner. For example, when describing HEVCFF the term "access unit" may correspond to the term "sample" in the ISOBMFF and an access unit may be described using either term.

In ISOBMFF, a box, the elementary syntax element, includes a four-character type, the byte count of the box, and the payload. A box type defines the logical relationship between a particular box and other types of boxes. The box type may also describe what data is mandatory for the particular box type and what data is optional for the particular box type. A box may be part of a sequence or group of boxes and may contain other boxes, which may be referred to as sub-boxes.

In ISOBMFF, a Movie box ("moov") contains metadata for the continuous media streams present in the file. The metadata for the continuous media streams present in the file may be further enclosed within additional boxes in the movie box, such as a Track box ("trak"). Continuous media streams may be represented in an ISOMBFF file as a track, where a track is a logical structure that references metadata which may be enclosed within the movie box and wherein the media stream consists of a sequence of samples. In ISOBMFF, a media stream may be enclosed within boxes, such as a Media Data box ("mdat") and sub-boxes thereof. Further, in some examples a media stream may be stored directly in an ISOBMFF file. The media content for a track consists of a sequence of samples, such as audio or video access units. A sequence of samples may be referred to as a stream. The ISOBMFF specifies a media track that contains an elementary media stream. The metadata for each track includes a list of sample description entries, each providing the coding or encapsulation format used in the track and the initialization data for processing that format. Each sample is associated with one of the sample description entries of the track. Some file types based on ISOBMFF also include hint tracks. Hint tracks include information that facilitates the reconstruction of media content such that quality and reliability are improved when media content is streamed over a network.

The ISOBMFF specifies the following types of tracks: a media track, which contains an elementary media stream, a hint track, which either includes media transmission instructions or represents a received packet stream, and a timed metadata track, which comprises time-synchronized metadata.

Although originally designed for storage, the ISOBMFF has proven to be very valuable for streaming, e.g., for progressive download or DASH. For streaming purposes, the movie fragments defined in ISOBMFF can be used.

The metadata for each track includes a list of sample description entries, each providing the coding or encapsulation format used in the track and the initialization data for processing that format. Each sample is associated with one of the sample description entries of the track.

The ISOBMFF enables specifying sample-specific metadata with various mechanisms. Specific boxes within the Sample Table box ("stbl") have been standardized to respond to common needs. For example, a Sync Sample box ("stss") is used to list the random access samples of the track. A sync sample identifies the presence of an instantaneous decoding refresh (IDR) access unit of the MVC or 3VC bitstream for any sample entry that includes an MVC or 3VC configuration record, respectively. The sample grouping mechanism enables mapping of samples according to a four-character grouping type into groups of samples sharing the same property specified as a sample group description entry in the file. Several grouping types have been specified in the ISOBMFF.

Similar to a file stored according to ISOBMFF, an HEVC file may include a series of elementary streams that reference metadata. In the HEVCFF a sample may be referred to as an access unit as defined in ISO/IEC 23008-2. In the HEVCFF, metadata may also be included in sample description entries. The HEVCFF may allow for hinting, but it should be noted that what the hint tracks refers to as "B frames" in some file formats may actually be "disposable" pictures or non-reference pictures as defined in ISO/IEC 23008-2. Further, a file format used for the storage of HEVC video content may use the existing capabilities of the ISOBMFF, but also may define extensions to support specific HEVC coded video content features such as: parameter sets, temporal scalability, and random access recovery point.

In most cases, to store video content of a particular video codec based on the ISOBMFF, a file format specification to that video codec is used. In some cases, for the storage of video streams containing multiple coded views with depth that is coded as an extension to a standard, a file format compatible with that standard may be used for the multiple coded views with depth. For example, the file format for MVC (which is part of the AVC file format) may be reused for storage of video streams containing multiple coded views plus depth (MVC+D). Using the file format for MVC to store MVC+D is possible because the design of MVC+D is based on MVC. However, direct application of the MVC file format for storage of MVC+D contents has at least the following shortcomings. First, there would be no way to indicate whether a view included in a track contains only texture view, only depth view, or both texture and depth view components. Further, there would be no way to indicate which part (the texture view, the depth view, or both) of a first view that a second view depends on is required for decoding the second view. Also, there would be no way to signal the spatial resolution of the depth views without parsing into the sequence parameter sets (SPS) referred to by the depth view components.

The techniques of this disclosure may solve one or more of the above problems, as well as provide other improvements, to enable efficient and flexible storage of video streams containing multiple coded views with depth. Although this description is specific to storage of MVC+D video streams based on the MVC file format, the techniques described herein can apply to any file format for storing of such video content coded by any video codec. Clause 7 of ISO/IEC 14496-15 specifies the MVC file format. Techniques of this disclosure may extend Clause 7 of ISO/IEC 14496-15 to storage of 3D Video Coding (3VC) data containing multiple views with depth. Several new boxes and sample entry types are defined in this disclosure.

A single media file may contain multiple tracks (for example, movie and audio tracks, such as video data streams 146 and audio data streams 148). A sample entry provides for storage of top level heading information for a sample or a track (which in some examples, a track may consist of one or more samples). A sample may be, for example, an access unit, such as access unit 150-1, or part of an access unit (for example, in an MVC or a 3VC track). A sample entry provides a codec for a track with relevant coding information for the track or sample, such as profile, level, and tier information, as well as other high level information. In some examples, one or more sample entries are present in multiview with depth media file 142.

According to techniques described herein, a View Identifier box defined in the MVC file format is changed. In one example, the View Identifier box may be changed to indicate, for each of the views included in a track associated with the View Identifier box, the presence of texture views and/or depth views in the track and in the stream. In another example, the View Identifier box may be changed to indicate how a texture view and a depth view of a reference view are required for decoding a specific view. For example, only the texture view, only the depth view, or both views of the reference view may be required to decode the specific view. The View Identifier Box may be included in a sample entry or a multiview group entry.

Techniques of this disclosure also support signaling spatial resolutions of depth views. A spatial resolution of a depth view may be indicated in a newly defined 3VC Depth Resolution Box. The 3VC Depth Resolution Box may be included in a newly defined 3VC Configuration Box. The 3VC Configuration Box includes a 3VC decoder configuration record, 3VCDecoderConfigurationRecord, and is included in at least one of either a sample entry of type '3vc1' or '3vc2'. The 3VC Configuration Box may be included in another sample entry. The 3VC decoder configuration record is defined to have the same syntax as MVCDecoderConfigurationRecord, but with different semantics to indicate characteristics related to a 3VC video steam.

In some examples, a 3VC Scalability Information supplemental enhancement information (SEI) Message Box (referred to herein as "SEI Message Box") is defined. The SEI Message Box contains the 3DVC scalability information SEI message defined in the MVC+D codec specification. The SEI Message Box can be included in the sample entry.

Further, techniques of this disclosure provide for storage of a texture view and a depth view of a particular view in separate tracks. In some examples, a new track reference type with type value 'deps' is defined, the presence of which indicates that the current track contains the depth view that is associated with a texture view in the referenced track.

In some examples, a new value of Compressorname is recommended for a file containing 3VC video streams. The new name is "\0123VC Coding."

Techniques described herein introduce two new sample entry types, '3vc1' and '3vc2' for 3VC tracks with depth NAL units only. Extractors are not allowed in '3vc1' and are allowed in '3vc2.' Some existing sample entry types are further defined. The sample entry type 'avc1' is defined to contain AVC, MVC and 3VC configurations, for 3VC tracks with AVC, MVC and depth NAL units. The sample entry type 'mvc1' is further defined to contain MVC and 3VC configurations, for 3VC tracks without AVC NAL units but with MVC and depth NAL units where extractors are not allowed. The sample entry type 'mvc2' is further defined to contain MVC and 3VC configurations, for 3VC tracks without AVC NAL units but with MVC and depth NAL units where extractors are allowed. It should be noted that other names of sample entry types may be used with similar semantics described above.

FIG. 1 is a conceptual diagram illustrating the structure of an example multiview with depth media file 142 that may be generated according to the techniques described in this disclosure. Multiview with depth media file 142 is based on the ISOBMFF and the current AVC file format. It should be noted that the example multiview with depth media file 142 in FIG. 1 is intended to illustrate the logical relationship between data streams and metadata. In other examples, media file 142 may be based on other media file formats.

Techniques similar to that described herein for multiview with depth media file 142 may be applied to other file formats to accommodate three dimensional video. For the sake of brevity, the complete encapsulation structure of multiview with depth media file 142 has not been illustrated. However, multiview with depth media file 142 may utilize boxes and encapsulation structures defined according to ISOBMFF and the AVC file format.

The storage of MVC and 3VC streams can be supported by a number of structures, including information in the sample entry, the media information box, and sample groups. Table 1 provides an overview of the structures provided, their names, and a brief description of their functions. More specifically, Table 1 provides an example box, sample entry, and group structures for MVC and 3VC streams. Note that each group of rows starting with an entry in the left column (e.g., 'mint' and '?vc?') document a containment structure within that container; however, the higher level containment is not shown.

TABLE 1

| | | | | | Box Name | Brief Description |
|---|---|---|---|---|---|---|
| inf | | | | | Media Information Box | |
| | vci | | | | Multiview Information Box | |
| | | vcg | | | Multiview Group Box | Specifies a multiview group for the views of the multiview video stream that are output |
| | | | uff | | Buffering Information Box | Contains the buffering information of the bitstream subset specified by the multiview group |
| | | | vra | | Multiview Relation Attribute Box | Indicates the relation of the tracks or tiers of the respective multiview group with each other (when contained in a Multiview Group box) |
| | | | ibr | | Tier Bit Rate Box | Provides information about the bit rate values of the bitstream subset specified by the multiview group |
| | | | iri | | Tier Information Box | Provides information about the profile, level, frame size, discardability, and frame-rate of the bitstream subset specified by the multiview group |
| | | | wdi | | Multiview Scene Information Box | Indicates the maximum disparity in a scene with multiple views |
| | | wtc | | | Multiview Group Relation Box | Specifies a set of multiview groups from which one multiview group is decoded and played at any time |
| | | | vra | | Multiview Relation Attribute Box | Indicates the relation of the multiview groups with each other (when contained in a Multiview Group Relation box) |
| vc? | | | | | Sample Entry | (Note: various codes are used for sample entries) |
| | sib | | | | View Scalability Information SEI Message Box | Contains an SEI NAL unit containing only a view scalability information SEI message as specified in ISO/IEC 14496-10 Annex H |
| | cam | | | | Extrinsic Camera Parameters Box | Contains camera parameters that define the location and orientation of the camera reference frame with respect to a known world reference frame |
| | cam | | | | Intrinsic Camera Parameters Box | Contains camera parameters that link the pixel coordinates of an image point with the corresponding coordinates in the camera reference frame |
| | wid | | | | View Identifier Box | Indicates the views included in the track (when included in a sample entry) |
| | vcP | | | | MVC View Priority Assignment Box | Provides a URI containing a unique name of the method used to assign content_priority_id values for the View Priority sample grouping |
| | vcC | | | | MVC Configuration Box | |

TABLE 1-continued

| | | | Box Name | Brief Description |
|---|---|---|---|---|
| | vcC | | 3VC Configuration Box | Contains the 3VC decoder configuration record and the 3VC depth resolution box (for 3VC streams only) |
| | | dpr | 3VC Depth Resolution Box | Provides the resolution of depth views (for 3VC streams only) |
| | sib | | 3VC Scalability Information SEI Message Box | Contains an SEI NAL unit containing only a 3VC scalability information SEI message as specified in ISO/IEC 14496-10 Annex I |
| gpd | | | Sample Group Description Box | |
| | vif | | Multiview Group Entry | Contains the following boxes |
| | | uff | Buffering Information Box | Contains the buffer information of the tier |
| | | dep | Tier Dependency Box | Identifies the tiers that the current tier is dependent on |
| | | vip | Initial Parameter Sets Box | Contains parameter sets needed for decoding this tier and all the tiers it depends on |
| | | vpr | Priority Range Box | Reports the minimum and maximum priority_id of the NAL units mapped to this tier |
| | | ibr | Tier Bit Rate Box | Provides information about the bit rate values of a tier |
| | | iri | Tier Information Box | Provides information about the profile, level, frame size, discardability, and frame-rate of a tier |
| | | ipr | View Priority Box | Labels views with priorities based on content |
| | | wid | View Identifier Box | Indicates the views included in the tier (when included in a Multiview Group entry,) |
| | trt | | Decode Re-timing Group Entry | Provides adjusted decoding times when high temporal layers are discarded |
| | cnm | | Sample Map Group Entry | Provides the mapping of NAL units to multiview groups for all samples in the track |

The structures within a sample entry provide information for the decoding or use of the samples (for example, video information) that are associated with that sample entry. Sample groups provide time-varying information about the track as a whole, assisting, for example, with the extraction of subsets of the media within a track. Information in the Multiview Information Box (appearing in the media information box) can span several tracks and is descriptive of collections of tracks, even though the Multiview Information Box resides in the track containing the base view of the stream.

In some examples, MVC and 3VC Video Elementary Streams contain all video coding related NAL units (that is, those NAL units containing video data or signaling video structure) and may contain non-video coding related NAL units such as SEI messages and access unit delimiter NAL units. Also, aggregators or extractors may be present in MVC and 3VC video streams. Other NAL units that are not expressly prohibited may be present, and if they are unrecognized they may be ignored (for example, not placed in the output buffer while accessing the file). MVC and 3VC streams may also be stored using associated parameter set streams, when needed. There may be AVC VCL NAL units, MVC VCL NAL units and non-VCL NAL units, present in an MVC video elementary stream. There may be AVC VCL NAL units, MVC VCL NAL units, depth VCL NAL units and non-VCL NAL units, present in a 3VC video elementary stream. Additionally, there may be Aggregator or Extractor NAL units present in an MVC or a 3VC video elementary stream.

Multiview with depth media file 142 may store continuous media (e.g., audio and video), static media (e.g., images), and metadata. The elementary syntax structure in the ISOBMFF is a box, which includes a four-character coded box type, the byte count of the box, and the payload. Multiview with depth media file 142 consists of a sequence of boxes. In the example illustrated in FIG. 1, multiview with depth media file 142 includes a movie box 144, video data streams 146-1 through 146-N (collectively referred to herein as "video data streams 146"), and audio data streams 148-1 through 148-N (collectively referred to herein as "audio data streams 148"), wherein N may be any positive integer, and may be the same or different number for the different instances of N in FIG. 1.

Video data streams 146 may correspond to the video or visual tracks described in ISOBMFF. A video stream may be represented by one video track in multiview with depth media file 142. Each of video data streams 146-1 through 146-N may include one or more access units 150-1 through 150-N (collectively referred to herein as "access units 150"). Access units 150 in multiview with depth media file 142 may be defined according to ISOBMFF, or more specifically, MVC or HEVCFF. Access units 150 may correspond to a sample in ISOBMFF. Access units 150 may be externally framed and have a size supplied by that external framing. In some cases, metadata box 154 may include information that defines the size of access units 150. Access units 150 may include a set of NAL (i.e., Network Abstraction Layer) units 152-1 through 152-N (collectively referred to herein as "NAL units 152"). NAL units 152 may be defined according to HEVCFF.

Each NAL unit 152 may include a length field that indicates the length of the NAL unit, e.g., in bytes or other units of length or size associated with data storage. In some examples, the length field can be configured to be one, two, or four bytes. Length fields enable easy scanning of NAL units within an access unit 150. NAL units 152 may contain NAL unit data as specified in ISO/IEC 23008-2. In addition to other types of NAL units, HEVCFF defines the following types of NAL units: Video data NAL units, which may be referred to as VCL NAL units, Supplemental Enhancement Information (SEI) NAL units, and Access unit (AU) delimiter NAL units, as well as other types of NAL units. It should be noted that NAL unit types that are reserved in ISO/IEC 23008-2 may acquire a definition in the future. Some file readers may be configured to ignore NAL units with reserved values of NAL unit type when they are present in these arrays. It should be noted that this 'tolerant' behavior is designed so that errors are not raised, allowing the possibility of backwards-compatible extensions to these arrays in future specifications. VCL NAL units may be formatted such that all coded slice NAL units for a single picture are contained within the access unit whose decoding time and composition time are those of the picture. Further, access units 150 may be required to contain at least one video data NAL unit.

Movie box 144 may be similar to an ISOBMFF 'moov' box. As described herein, 'moov' is a four-character coded box type for Movie box 144 defined in the ISOBMFF. Furthermore, boxes may contain other boxes. Movie box 144 ("moov") contains metadata for any continuous media stream 146 and 148 present in multiview with depth media file 142.

Movie box 144 may contain one or more Metadata boxes 154. Metadata box 154 may be similar to and may contain metadata for each of video data streams 146 and/or audio data streams 148. In one example, metadata may be included within one or more metadata tables 156 included in one or more Metadata box 154. Metadata tables 156 may include sample entries which correspond to video data streams 146. One example of a metadata table 156 is a sample table box. Each of video data streams 146 may reference one or more of metadata tables 156.

The ISOBMFF enables specifying sample-specific metadata with various mechanisms. Metadata box 154 may further include specific boxes within a Sample Table box 162 to contain other metadata information such as sample description boxes that further contain sample entries. A four character coded box type for Sample Table box 162 may be "stbl." For example, a Sync Sample box 164 may be used to list the random access samples of the track. A four character coded box type for Sync Sample box 164 may be "stss." The sample grouping mechanism enables mapping of samples according to a four-character grouping type into groups of samples sharing the same property specified as a sample group description entry in multiview with depth media file 142. Several grouping types have been specified in the ISOBMFF.

In some examples, a shadow sync box is not used for video data described by any MVC or 3VC sample entries.

In some examples, an independent and disposable samples box may be used. If an independent and disposable samples box is used in a track which is both AVC and MVC compatible, then the information indicated by the independent and disposable samples box is true no matter what valid subset of the MVC data (and possibly only the AVC data) is used. The 'unknown' values (value 0 of the fields sample-depends-on, sample-is-depended-on, and sample-has-redundancy) may be used if the information varies. If an independent and disposable samples box is used in a track which is compatible to all of AVC, MVC and 3VC, then care should be taken that the statements are true no matter what valid subset of the 3VC data (possibly only the AVC data or only the MVC data) is used. The 'unknown' values (value 0 of the fields sample-depends-on, sample-is-depended-on, and sample-has-redundancy) may be used if the information varies.

Multiview with depth media file 142 may include a random access recovery sample group and a random access point sample group. For video data described by a sample entry of type 'avc1' or 'avc2,' the random access recovery sample group and the random access point sample group identify random access recovery points and random access points, respectively, for all of an AVC decoder, an MVC decoder, and a 3VC decoder operating on the entire bitstream. For video data described by an MVC sample entry type, the random access recovery sample group identifies random access recovery in the entire MVC bitstream and the random access point sample group identifies random access points in the entire MVC bitstream. For video data described by a 3VC sample entry type, the random access recovery sample group may identify random access recovery in the entire 3VC bitstream and the random access point sample group identifies random access points in the entire 3VC bitstream.

Movie box 144 may further contain one or more Track boxes 158 and one or more Media Data boxes 160. The metadata for a track is enclosed in at least one Track box 158. The four character coded box type for Track box 158 may be "trak." The media content of a track is either enclosed in a Media Data box 160 or directly in a separate file. The four character coded box type for Media Data box 160 may be "mdat." The media content for tracks consists of a sequence of samples, such as audio or video access units.

Continuous media streams present in multiview with depth media file 142 may be represented in a track. The ISOBMFF specifies the following types of tracks: a media track, which contains an elementary media stream, a hint track, which either includes media transmission instructions or represents a received packet stream, and a timed metadata track, which comprises time-synchronized metadata.

An MVC or a 3VC stream may be placed in tracks in a number of ways, among which are the following: all the views in one track, labeled with sample groups; each view, including both texture views and depth views when both are present, in its own track, labeled in the sample entries; a hybrid, one track containing all views, and one or more single-view tracks each containing a view that can be independently coded; the expected operating points each in a track (e.g. the AVC base, a stereo pair, a multiview scene, or a 3VC scene); and, for 3VC only, each texture or depth view in its own track, labeled in the sample entries.

The MVC and 3VC file format allows storage of one or more views into a track. Storage of multiple views per track can be used, for example, when a content provider wants to provide a multiview bitstream that is not intended for subsetting or when the bitstream has been created for a few pre-defined sets of output views (such as 1, 2, 5, or 9 views) where tracks can be created accordingly. If more than one view is stored in a track and there are several tracks (more than one) representing the MVC or SVC bitstream, the use of the sample grouping mechanism may be recommended. The sample grouping mechanism can be used to define tiers identifying the views present in the track and to extract required NAL units for certain operation points conveniently. The sample grouping mechanism is usually used with aggregator NAL units to form regular NAL unit patterns within samples. Thus, SVC-like sample grouping, aggregators, and view definitions for sample groups are specified for MVC and 3VC.

Several techniques are included in this disclosure to indicate whether a view included in a track contains only texture view, only depth view, or both texture and depth views, indicate which part (the texture view, depth view, or both) of a first view that a second view depends on is required for decoding the second view, signal the spatial resolution of the depth views such that parsing the sequence parameter sets (SPSs) referred to by the depth view components is not required, and to improve efficiency and flexibility of storage of video streams containing multiple coded views with depth.

Furthermore, storage of the texture view and depth view of a particular view in separate tracks is supported in some examples. A new track reference type with type value 'deps' is defined. The presence of the new track reference type 'deps' may indicate that a current track contains the depth view that is associated with a texture view in a referenced track. In an alternative example, a new type of track reference is defined with type value 'tref,' the presence of which in a track indicates that the current track depends on the texture view stored in the referenced track. In another alternative example, another new type of track reference is defined with type value 'dref,' the presence of which in a track indicates that the current track depends on the depth view stored in the referenced track.

Multiview with depth media file 142 may further contain one or more View Identifier boxes 172, which may be included in a sample entry or a multiview group entry. For example, View Identifier box 172 may indicate, for each view included in a track, the presence of texture and/or depth views in the track and in the video stream. In another example, View Identifier box 172 may indicate how the texture view and depth view of a reference view are required for decoding a specific view. That is, View Identifier box 172 may contain syntax information that indicates whether only the texture view is required, only the depth view is required, or both texture and depth views are required to decode a specific view. As used herein, encoding may refer to composing or storing information according to a specified file format and decoding may refer to parsing information according to the file format. Generally, coding may refer to either composing or parsing.

Multiview with depth media file 142 may further contain one or more 3VC Configuration boxes 168. The 3VC Configuration box 168 may include a 3VC decoder configuration record. The 3VC decoder configuration record may be named 3VCDecoderConfigurationRecord. The 3VC decoder configuration record may include similar syntax as MVCDecoderConfigurationRecord, but have different semantics to indicate characteristics related to a 3DV video stream. The 3VC Configuration box may be included in a sample entry, in some examples, must be included in a sample entry of type '3vc1' or '3vc2.'

Techniques of the disclosure also support signaling of the spatial resolution of depth views. The 3VC Configuration box 168 may further include a 3VC Depth Resolution box 170. Spatial resolutions of depth views may be signaled in the 3VC Depth Resolution box 170. In others examples, the 3VC Depth Resolution box 170 may be directly added into a sample entry. In another alternative example, the width and height of depth views may be directly signaled in the 3VC decoder configuration record.

Multiview with depth media file 142 may further contain one or more 3VC Scalability Information SEI Message boxes 166. 3VC Scalability Information SEI Message box 166 may contain a 3DVC scalability information supplemental enhancement information (SEI) message defined in the MVC+D codec specification. In some examples, 3VC Scalability Information SEI Message box 166 may be included in a sample entry.

Multiview with depth media file 142 may further contain a Multiview Group box 174. Multiview Group box 174 may indicate operation points used in coding video data streams 146, including 3DV operation points. In one example, multiview grouping is a structure and grouping mechanism that indicates the association of NAL units with different types and hierarchy levels of scalability. A four-character coded box type for Multiview Group box 174 may be 'mvcg.' In some examples, Multiview Group box 174 may be contained in a Multiview Information box ('mvci'). There may be zero or more Multiview Group boxes 174 present in multiview with depth media file 142.

Multiview Group box 174 may specify a multiview group for the views of the MVC or 3VC stream that are output. Target output views may be indicated on the basis of track_id, tier_id, or view_id. When the views included in a track match an operating point, track_id (that is, entry_type equal to 0) may be used within Multiview Group box 174. When multiview sample grouping is in use, and tiers cover more than one view or some tiers contain a temporal subset of the bitstream, tier_id (that is, entry_type equal to 1) may be used within Multiview Group box 174. Otherwise, one of the view_id based indications (that is, entry_type equal to 2 or 3) may be used.

When entry_type is equal to 0 or 1, the following may apply. Each view in a track or tier that is included in Multiview Group box 174 is a target output view, and if a track or tier included in this box contains multiple views, all the contained views are target output views.

Semantics for Multiview Group box 174 include a syntax element num_entries, which may indicate a number of tracks (entry type 0), tiers (entry type 1), target output views (entry type 2), or continuous sets of target output views (entry type 3) included in the multiview group.

A further technique described herein includes defining a common attribute and/or a differentiating attribute to indicate whether 3DV operation points indicated in Multiview Group box 174 are present. In another example, information may be included in Multiview Group box 174 to indicate whether an operation point indicated in Multiview Group box 174 is a 3DC operation point or an MVC operation point. An operation point may be an independently decodable subset of a scalable bitstream. A bitstream subset of an MVC or a 3VC operating point may represent a particular set of target output views at a particular temporal resolution, and consists of data that may be used to decode the particular bitstream subset. In 3VC, each target output view in the bitstream subset of a 3VC operating point may contain a texture view, a depth view, or both. Further, in some examples, syntax elements are introduced, which may be included in Multiview Group box 174, to indicate whether the output views indicated in Multiview Group box 174 contain texture views only, depth views only, or both texture and depth views.

In additional techniques of this disclosure, new sample entry types are defined. For example, 3vc1 and 3vc2 are defined for 3VC tracks with depth NAL units only, where extractors are not allowed and allowed, respectively. An extractor is an in-stream structure (e.g., a structure residing within sample data) to enable efficient extraction of NAL units from tracks other than the one containing the relevant media data. For example, an extractor may contain instructions on how to extract data from other tracks.

The example of FIG. 1 illustrates just one possible way of organizing multiview with depth media file 142. In some examples, one or more of the boxes may be sub-boxes of other boxes. That is, in different examples, the various boxes can be organized and configured in different ways than are shown in FIG. 1. Furthermore, one or more of the techniques described herein may be used in any combination with one or more other techniques described herein.

Figure 2:
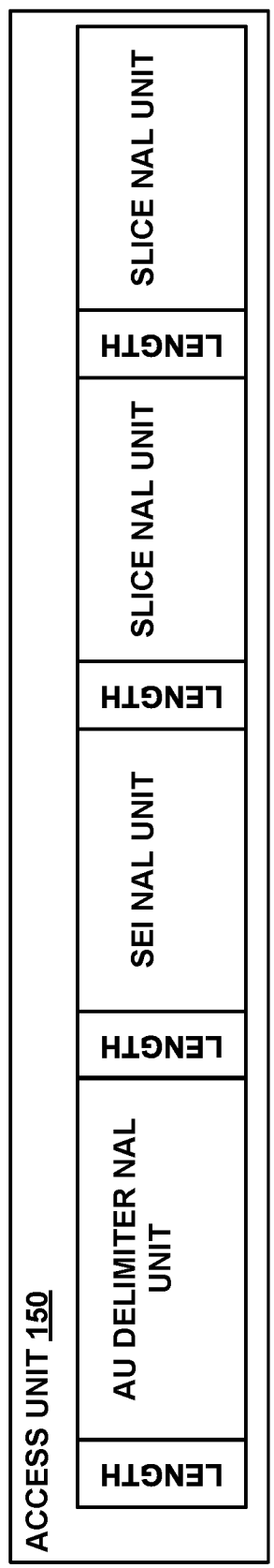
FIG. 2 illustrates an example of an MVC+D access unit which may be included in a media file generated according to the techniques described in this disclosure.

FIG. 2 illustrates an example of an MVC+D access unit 150 which may be included in a media file generated according to the techniques described in this disclosure. FIG. 2 illustrates an example structure of a sample, which in this example is an entire access unit 150. Samples are externally framed and have a size supplied by that external framing. The syntax of a sample is configured via the decoder specific configuration for the elementary stream. An example of the structure of a video sample is depicted in the following figure. A 3VC sample may include one or more view components as defined in Annex I of ISO/IEC 14496-10 and the associated non-VCL NAL units, where each view component may contain a texture view component, a depth view component, or both.

As illustrated in FIG. 2, access unit 150 includes a set of NAL units, including an AU delimiter NAL unit, a SEI NAL unit, and two slice NAL units. Each NAL unit is represented with a length, which indicates a length in bytes of the NAL unit that follows it in bitstream order. The length field may be configured to be of 1, 2, or 4 bytes, for example. A NAL unit contains the NAL unit data as specified in the applicable video coding standard.

In some examples, a coded slice extension is provided for depth coded slice NAL units. In some examples, all depth coded slice NAL units for a single instant in time shall be contained in a sample whose composition time is that of a picture represented by the access unit. A 3VC sample shall contain at least one AVC, MVC, or depth VCL NAL unit.

In some examples, an access unit, such as access unit 150-1, may be reconstructed. In order to reconstruct access unit 150-1 from samples of one or more MVC or 3VC tracks, the target output views may need to be determined, by examining the Multiview Group box 174 and a Multiview Group Relation box. An explicit_au_track flag equal to 1 states that this track is a complete operating point; nonetheless, the track may be examined to determine which views delivered by this track are the output views.

If the target output views are not exactly represented by any track marked with explicit_au_track equal to 1 in an MVC decoder configuration record or 1 3VC decoder configuration record, access unit 150-1 may be reconstructed as follows. The views that are required for decoding the determined target output views can be concluded from reference view identifiers included in the View Identifier box, the 'scal' track references, or Tier Dependency boxes.

If several tracks contain data for access unit 150-1, the alignment of respective samples in tracks is performed on decoding time, for example, using the time-to-sample table only without considering edit lists. Access unit 150-1 is reconstructed from the respective samples in the required tracks and tiers by arranging their NAL units in an order conforming to ISO/IEC 14496-10. The following order provides an outline of the procedure to form a conforming access unit: all parameter set NAL units (from the associated parameter set tracks and from the associated elementary stream tracks); all SEI NAL units (from the associated parameter set tracks and from the associated elementary stream tracks); view components in ascending order of view order index value; and within a view component, if both texture and depth are present, then the texture view component precedes the depth view component. NAL units within a texture or depth view component are in their appearance order within the sample.

Figure 3:
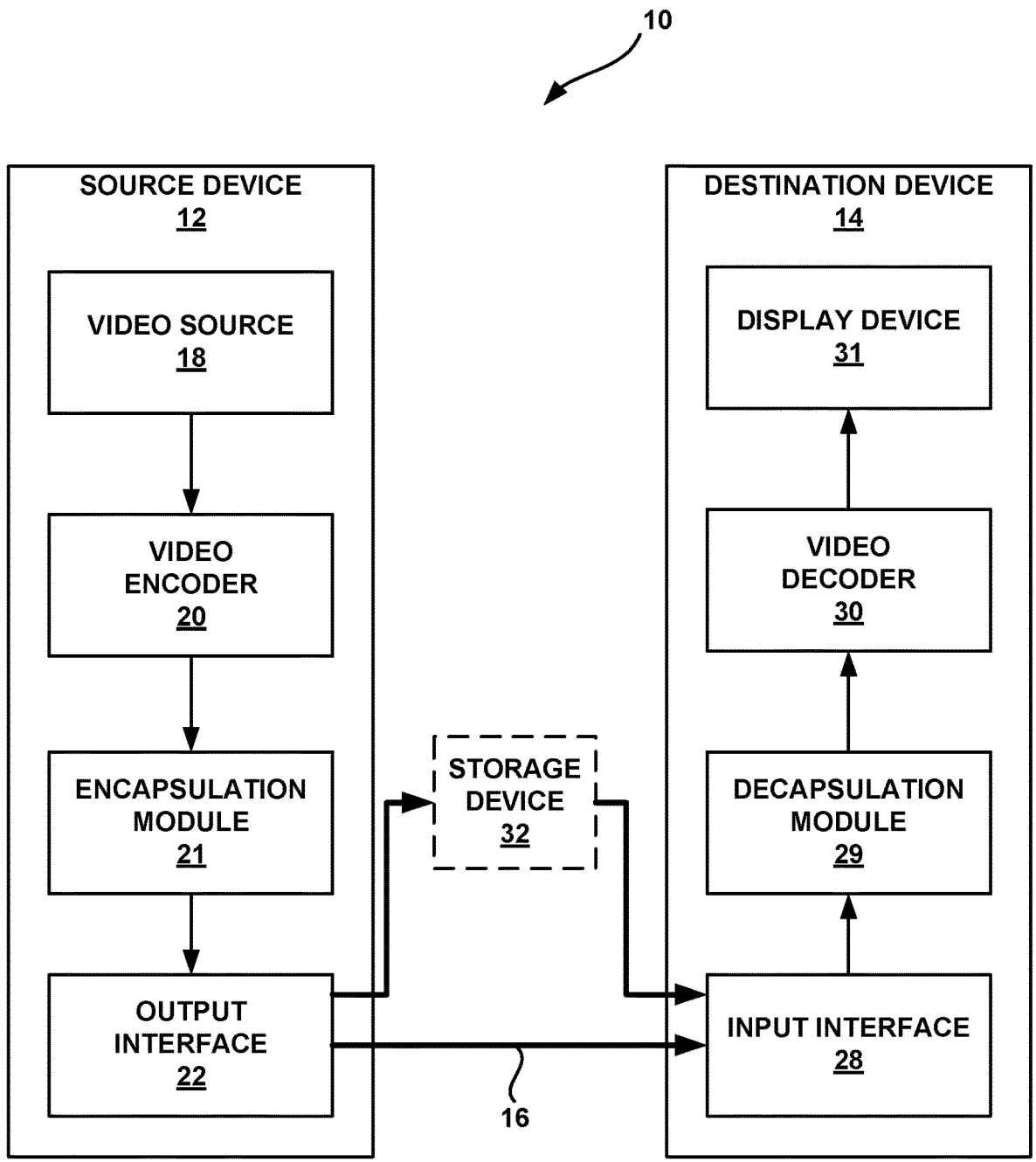
FIG. 3 is a block diagram illustrating an example video encoding and decoding system that may utilize the techniques described in this disclosure.

FIG. 3 is a block diagram illustrating an example video encoding and decoding system 10 that may utilize the techniques described in this disclosure. In one example, system 10 may be configured to compose or parse media file containing multiple coded views plus depth. As used herein, the terms compose and encapsulate may be used interchangeably. Likewise, as used herein, the terms parse and decapsulate may be used interchangeably. Further, in some examples, the term encode is used similarly as the term compose, and the term decode is used similarly to the term parse.

As shown in FIG. 3, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data, such as a composed MVC+D media file, may be output from output interface 22 to a storage device 32. Similarly, encoded data may be accessed from storage device 32 by input interface 28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by source device 12. In some examples, storage device 32 stores encoded video content that an encapsulation module 21 later retrieves for encapsulation. Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20, encapsulation module 21, and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback.

Encapsulation module 21 may receive encoded video content from video encoder 20 and generate a video file according to techniques described herein. In one example, encapsulation module 21 may receive MVC or 3VC coded video content and generate a video file using a file format based on the ISOBMFF and the current version of the AVCFF. FIG. 3 shows source device 12 including a video encoder 20. However, in some examples, source device 12 may not include any video encoder, but does include encapsulation module 21 that encapsulates encoded video data. In some examples, the encoded video data may be stored in a remote storage location, such as storage device 32, for example. As described herein, encapsulation module 21 may be a video coding device.

Destination device 14 includes an input interface 28, a decapsulation module 29, a video decoder 30, and a display device 31. In some cases, input interface 28 may include a receiver and/or a modem. Input interface 28 of destination device 14 receives the encoded video data over link 16. The encoded video data communicated over link 16, or provided on storage device 32, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Decapsulation module 29 may be configured to receive a video file and parse the video file and feed the decapsulated bitstream to video decoder 30 such that video decoder 30 may output decoded video data. In some examples, decapsulation module 29 may perform reciprocal processes of encapsulation module 21. Video decoder 30 may, in some examples, perform a decoding pass generally reciprocal to the encoding pass described with respect to video encoder 20. In some examples, decapsulation module 29 is included in video decoder 30. In the remainder of this document, video decoder 30 parsing a file may refer to a decapsulation module, such as decapsulation module 29 included in video decoder 30, parsing a file. As described herein, encapsulation module 21 may be a video coding device.

Display device 31 may be integrated with, or external to, destination device 14. In some examples, destination device 14 may include an integrated display device and also be configured to interface with an external display device. In other examples, destination device 14 may be a display device. In general, display device 31 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the Advanced Video Coding standard or the High Efficiency Video Coding (HEVC) standard and extensions presently under development, and may conform to the HEVC Test Model (HM). In particular, video encoder 20 and video decoder 30 may operate according to AVC based Multiview Coding Plus Depth (MVC+D) and AVC based 3D video (3D-AVC) coding standard is currently under development by JCT-3V, as outlined above. Alternatively or additionally, video encoder 20 and video decoder 30 may operate according to other proprietary or industry standards, such as the ITU-T H.264 standard, alternatively referred to as MPEG-4, Part 10, or extensions of such standards. The techniques of this disclosure, however, are not limited to any particular coding standard. Other examples of video compression standards include MPEG-2 and ITU-T H.263, as well as open formats such as VP8.

In some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of extensions to the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC.

Some details of video coding are described herein in the context of HEVC. However, the techniques may apply to ITU-T H.264/AVC, and more specifically to texture view and/or depth view coding consistent with an ISO base media file format (ISOBMFF).

The working model of the HM describes that a video frame or picture may be divided into a sequence of macroblocks, treeblocks or largest coding units (LCU) that include both luma and chroma samples. A treeblock may serve some similar purposes as a macroblock of the H.264 standard, although a treeblock has many differences relative to a macroblock.

Figure 4:
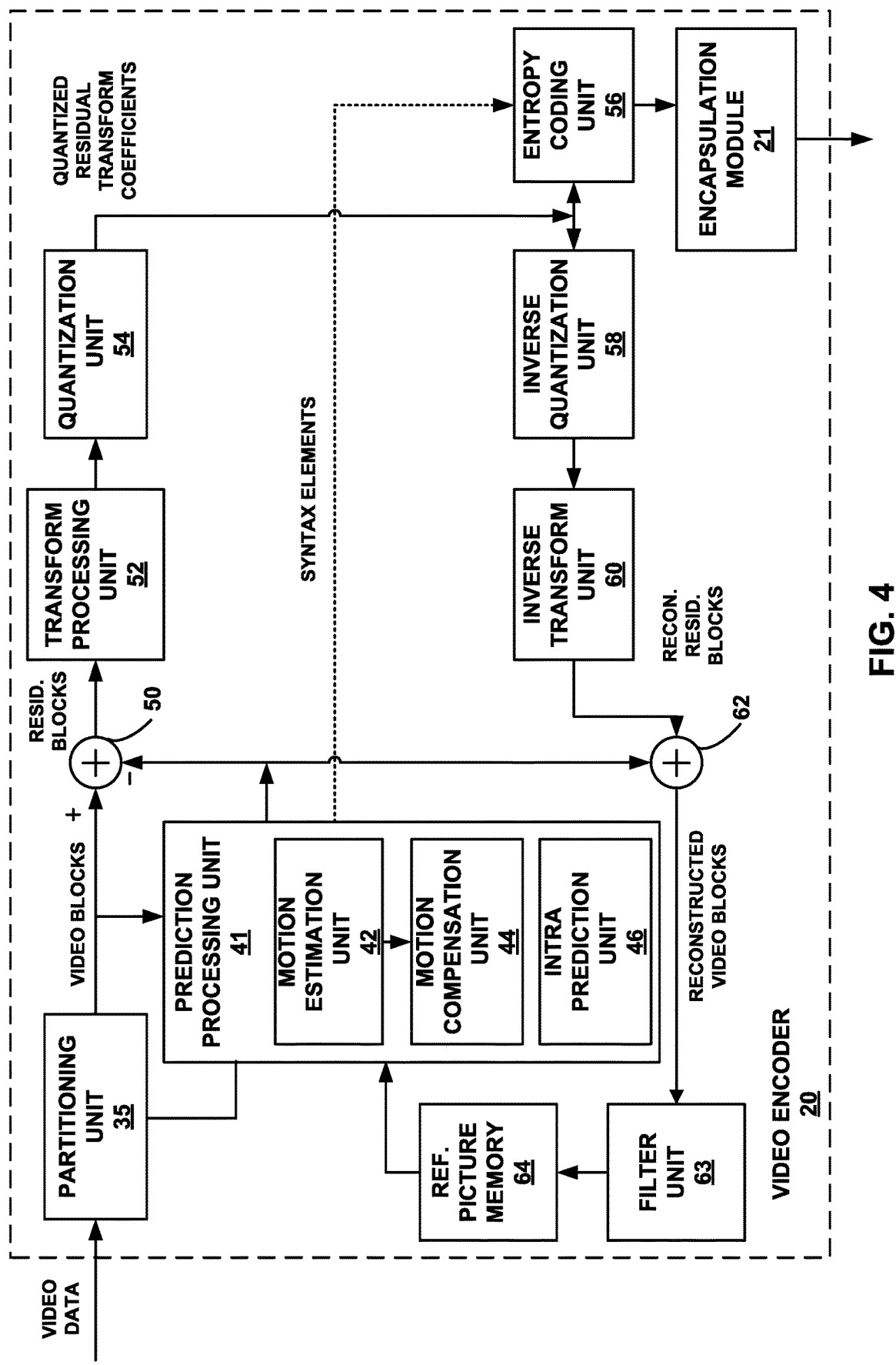
FIG. 4 is a block diagram illustrating an example video encoder that may implement the techniques described in this disclosure.

FIG. 4 is a block diagram illustrating an example video encoder 20 that may implement the techniques described in this disclosure. Video encoder 20 may compose a media file including multiview video data based on the ISO base media file format, such as multiview with depth media file 142 of FIG. 1. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 4, video encoder 20 includes a partitioning unit 35, prediction processing unit 41, filter unit 63, reference picture memory 64, summer 50, transform processing unit 52, quantization unit 54, and entropy coding unit 56. Prediction processing unit 41 includes motion estimation unit 42, motion compensation unit 44, and intra prediction unit 46. For video block reconstruction, video encoder 20 also includes inverse quantization unit 58, inverse transform unit 60, and summer 62. Filter unit 63 may generally represent one or more loop filters such as a deblocking filter, an adaptive loop filter (ALF), and a sample adaptive offset (SAO) filter. Although filter unit 63 is shown in FIG. 4 as being an in loop filter, in other configurations, filter unit 63 may be implemented as a post loop filter, in which case unfiltered data may be used in the coding loop.

As shown in FIG. 4, video encoder 20 receives video data, and partitioning unit 35 partitions the data into video blocks. This partitioning may also include partitioning into slices, tiles, or other larger units, as wells as video block partitioning, e.g., according to macroblocks and macroblock partitions, or possibly according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU (or a macroblock partition or sub-block) of a video block within a current video frame or picture relative to a predictive block within a reference picture.

A predictive block is a block that is found to closely match the PU (or a macroblock partition or sub-block) of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU (or a macroblock partition or sub-block) of a video block in an inter-coded slice by comparing the position of the PU (or a macroblock partition or sub-block) to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy coding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU (or a macroblock partition or sub-block) of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes. For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 46 may calculate ratios from the distortions and rates for the various encoded blocks to determine which intra-prediction mode exhibits the best rate-distortion value for the block.

In any case, after selecting an intra-prediction mode for a block, intra-prediction unit 46 may provide information indicative of the selected intra-prediction mode for the block to entropy coding unit 56. Entropy coding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy coding unit 56 may perform the scan.

Following quantization, entropy coding unit 56 entropy encodes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy coding unit 56, the encoded bitstream may be transmitted to video decoder 30, or archived for later transmission or retrieval by video decoder 30. Entropy coding unit 56 may also entropy encode the motion vectors and the other syntax elements for the current video slice being coded.

Inverse quantization unit 58 and inverse transform unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

Video encoder 20 of FIG. 4 represents an example of a video encoder configured to implement on or more of the techniques described herein. For example, encapsulation module 21 of video encoder 20 may compose a media file format from video streams containing multiple coded views. For example, encapsulation module 21 may compose a media file that includes a View Identifier box, such as View Identifier box 172 of FIG. 1, that indicates, for each of the view included in the track, the presence of texture and/or depth in the track and in the stream. Encapsulation module 21 may include View Identifier box 172 in a sample entry or a multiview group entry. In another example, encapsulation module 21 may compose a media file such that View Identifier box 172 indicates how a texture view and depth view of a reference view are required for decoding a specific view: whether only the texture view is required, only the depth view is required, or both are required. As shown in FIG. 4, encapsulation module 21 is part of video encoder 20. However, in other examples, encapsulation module 21 is separate from video encoder 20.

Furthermore, video encoder 20 may support storage of a texture view and a depth view of a particular view in separate tracks. In some examples, video encoder 20 is configured to use and interpret one or more new types of track references. For example, video encoder 20 may utilize a new track reference type with type value 'deps,' the presence of which may indicate that the current track contains the depth view that is associated with a texture view in the referenced track. In an alternative example, video encoder 20 may utilize another new track reference type with type value 'tref,' the presence of which in a track indicates that the current track depends on the texture view stored in the referenced track. In another alternative example, a new type of track reference is defined, e.g., with type value 'dref,' the presence of which in a track indicates that the current track depends on the depth view stored in the referenced track.

Video encoder 20 may support signaling of the spatial resolution of depth views. For example, video encoder 20 may signal spatial resolution of depth views in a newly defined 3VC Depth Resolution Box, which may be included in a 3VC Configuration Box. In some examples, the 3VC Configuration Box includes the 3VC decoder configuration record, and can be included in a sample entry (and must be included in a sample entry of type '3vc1' or '3vc2'). In some examples, the 3VCDepthResolutionBox is directly added into the sample entry. In another alternative example, video encoder 20 directly signals a width and height of depth views in the 3VC decoder configuration record. For example, video encoder 20 may compose a media file, such as multiview with depth media file 142 of FIG. 1, and add a 3VC Depth Resolution Box, such as 3VC Depth Resolution Box 170, into a sample entry. In another alternative example, video encoder 20 may signal a width and height of depth views directly in a 3VC decoder configuration record, that may be included in a 3VC Configuration box 168.

Video encoder 20 may also use newly defined sample entry types, '3vc1' and '3vc2,' for 3VC tracks with depth NAL units only, where extractors are not allowed and allowed, respectively. Video encoder 20 may further include, in an encoded media file, a 3VC Scalability Information SEI Message box to contain the 3DVC scalability information SEI message defined in MVC+D codec specification.

In another alternative example, video encoder 20 includes a common attribute and/or a differentiating attribute in a composed media file that indicates whether 3VC operation points indicated in a Multiview Group box (such as Multiview Group box 174) are present, whether an operation point indicated in a Multiview Group box is 3VC or MVC, or whether the output views indicated in a Multiview Group box contain texture only, depth only, or both.

Video encoder 20 may be configured to employ one or more of the techniques described herein to indicate whether a view included in a track consists of texture views, depth views, or both texture and depth views, indicate view dependency, signal spatial resolution of depth views without requiring parsing a SPS, and to improve efficiency and flexibility of storage of video streams containing multiple coded views with depth.

Referring again to FIG. 3, encapsulation module 21 may receive encoded video content from video encoder 20 and generate a video file according to techniques described herein. In one example, encapsulation module 21 receives AVC or HEVC coded video content and generate a video file using a file format based on the ISOBMFF and the current version of the AVCFF or HEVCFF, respectively.

Figure 5:
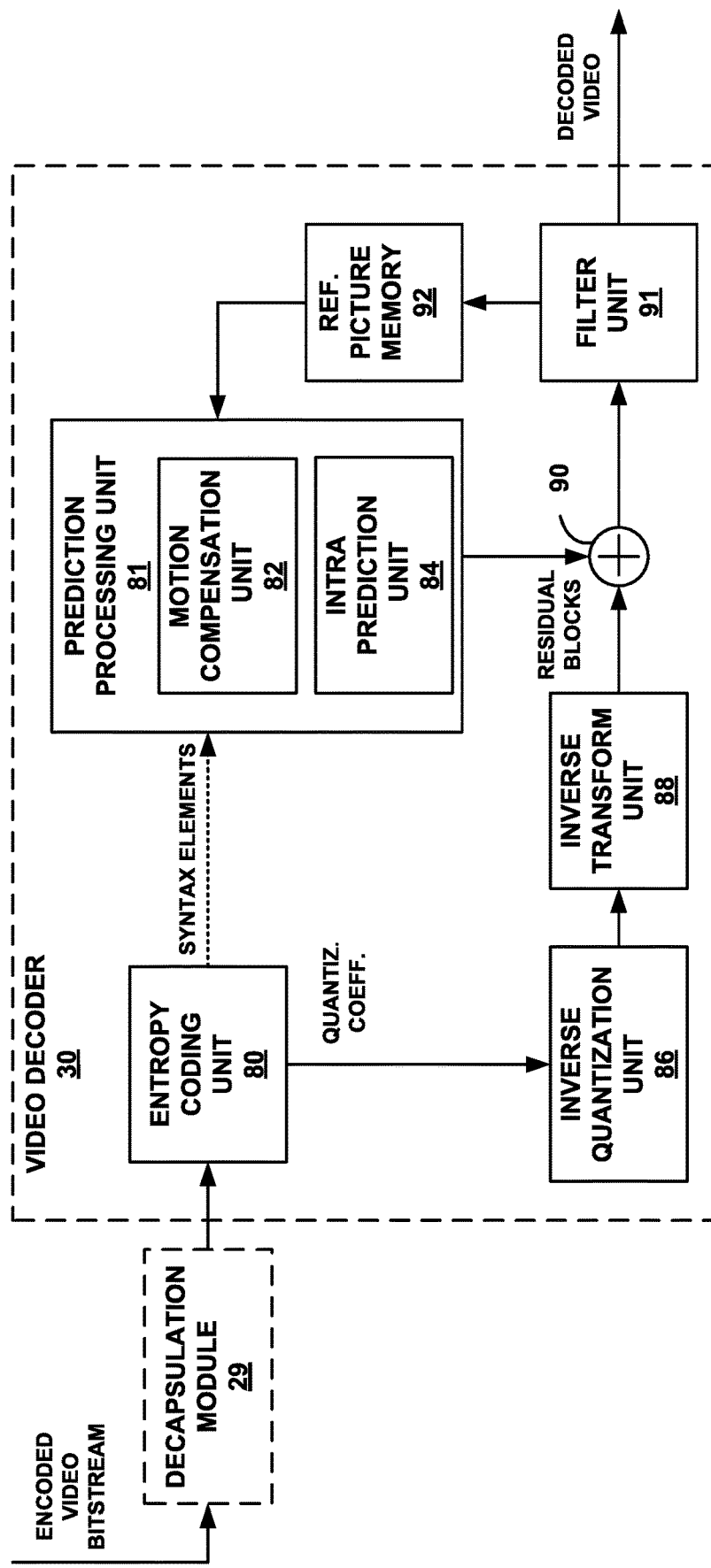
FIG. 5 is a block diagram illustrating an example video decoder and decapsulation module that may implement the techniques described in this disclosure.

FIG. 5 is a block diagram illustrating an example video decoder 30 and decapsulation module 29 that may implement the techniques of this disclosure. Decapsulation module 29 may parse a media file that includes multiview video data based on the ISO base media file format, such as multiview with depth media file 142 of FIG. 1. Decapsulation module 29 may provide the parsed media file to video decoder 30.

In the example of FIG. 5, video decoder 30 includes an entropy coding unit 80, prediction processing unit 81, inverse quantization unit 86, inverse transformation unit 88, summer 90, filter unit 91, and reference picture memory 92. Prediction processing unit 81 includes motion compensation unit 82 and intra prediction unit 84. Video decoder 30 may, in some examples, perform a decoding pass generally reciprocal to the encoding pass described with respect to video encoder 20 from FIG. 3.

During the decoding process, video decoder 30 receives an encoded video bitstream that represents video blocks of an encoded video slice and associated syntax elements from video encoder 20. Video decoder 30 may receive the encoded video bitstream from a network entity 29. Network entity 29 may, for example, be a server, a media-aware network element (MANE), a video editor/splicer, or other such device configured to implement one or more of the techniques described above. As described above, some of the techniques described in this disclosure may be implemented by network entity 29 prior to network 29 transmitting the encoded video bitstream to video decoder 30. In some video decoding systems, network entity 29 and video decoder 30 may be parts of separate devices, while in other instances, the functionality described with respect to network entity 29 may be performed by the same device that comprises video decoder 30.

Entropy coding unit 80 of video decoder 30 entropy decodes the bitstream to generate quantized coefficients, motion vectors, and other syntax elements. Entropy coding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction unit 84 of prediction processing unit 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy coding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy coding unit 80. The inverse quantization process may include use of a quantization parameter calculated by video encoder 20 for each video block in the video slice to determine a degree of quantization and, likewise, a degree of inverse quantization that should be applied. Inverse transform unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or otherwise improve the video quality. Filter unit 91 may represent one or more loop filters such as a deblocking filter, an adaptive loop filter (ALF), and a sample adaptive offset (SAO) filter. Although filter unit 91 is shown in FIG. 5 as being an in loop filter, in other configurations, filter unit 91 may be implemented as a post loop filter. The decoded video blocks in a given frame or picture are then stored in reference picture memory 92, which stores reference pictures used for subsequent motion compensation. Reference picture memory 92 also stores decoded video for later presentation on a display device, such as display device 31 of FIG. 1.

Video decoder 30 of FIG. 5 represents an example of a video decoder that may be used with a decapsulation module 29 configured to implement one or more of the techniques described herein. For example, decapsulation module 29 may parse a media file that includes stored video streams containing multiple coded views and provide it to video decoder 30. For example, decapsulation module 29 may parse a media file that includes a View Identifier box, such as View Identifier box 172 of FIG. 1, that indicates, for each of the view included in the track, the presence of texture and/or depth in the track and in the stream. Decapsulation module 29 may decode the View Identifier box 172 from a sample entry or a multiview group entry. In another example, video decoder 30 parses View Identifier box 172 in a media file to determine whether a texture view and depth view of a reference view are required for decoding a specific view. That is, decapsulation module 29 may determine whether only the texture view is required, only the depth view is required, or both are required.

Furthermore, decapsulation module 29 may parse a media file that contains a texture view and a depth view of a particular view in separate tracks. In some examples, decapsulation module 29 is configured to parse and interpret one or more new types of track references. For example, decapsulation module 29 parses a new track reference type with type value 'deps,' the presence of which indicates that the current track contains the depth view that is associated with a texture view in a referenced track. In an alternative example, decapsulation module 29 parses another new track reference type with type value 'tref,' the presence of which in a track indicates that the current track depends on the texture view stored in the referenced track. In another alternative example, decapsulation module 29 parses a new type of track reference with type value 'dref,' the presence of which in a track indicates that the current track depends on the depth view stored in the referenced track.

Decapsulation module 29 may determine spatial resolutions of depth views from parsing a media file composed according to techniques described herein. For example, decapsulation module 29 may determine spatial resolutions of depth views from the newly defined 3VC Depth Resolution Box, which may be included in a 3VC Configuration Box. In another alternative example, decapsulation module 29 directly determines a width and height of depth views from the 3VC decoder configuration record. For example, decapsulation module 29 may parse a 3VC decoder configuration record of a media file, such as multiview with depth media file 142 of FIG. 1 to determine the width and height of depth views associated with the media file.

Decapsulation module 29 may also parse newly defined sample entry types, '3vc1' and '3vc2,' for 3VC tracks with depth NAL units only. Decapsulation module 29 may further decode, from an encoded media file, a 3VC Scalability Information SEI Message box to access the 3DVC scalability information SEI message defined in MVC+D codec specification.

In another alternative example, decapsulation module 29 parses a common attribute and/or a differentiating attribute from the media file to determine whether 3VC operation points indicated in a Multiview Group box (such as Multiview Group box 174) are present, whether an operation point indicated in Multiview Group box 174 is 3VC or MVC, or whether the output views indicated in Multiview Group box 174 contain texture only, depth only, or both.

Decapsulation module 29 may be configured to employ one or more of the techniques described herein to determine whether a view included in a track consists of texture views, depth views, or both texture and depth views, determine view dependency, determine spatial resolution of depth views without requiring parsing a SPS, and to improve efficiency and flexibility of storage of video streams containing multiple coded views with depth.

Figure 6:
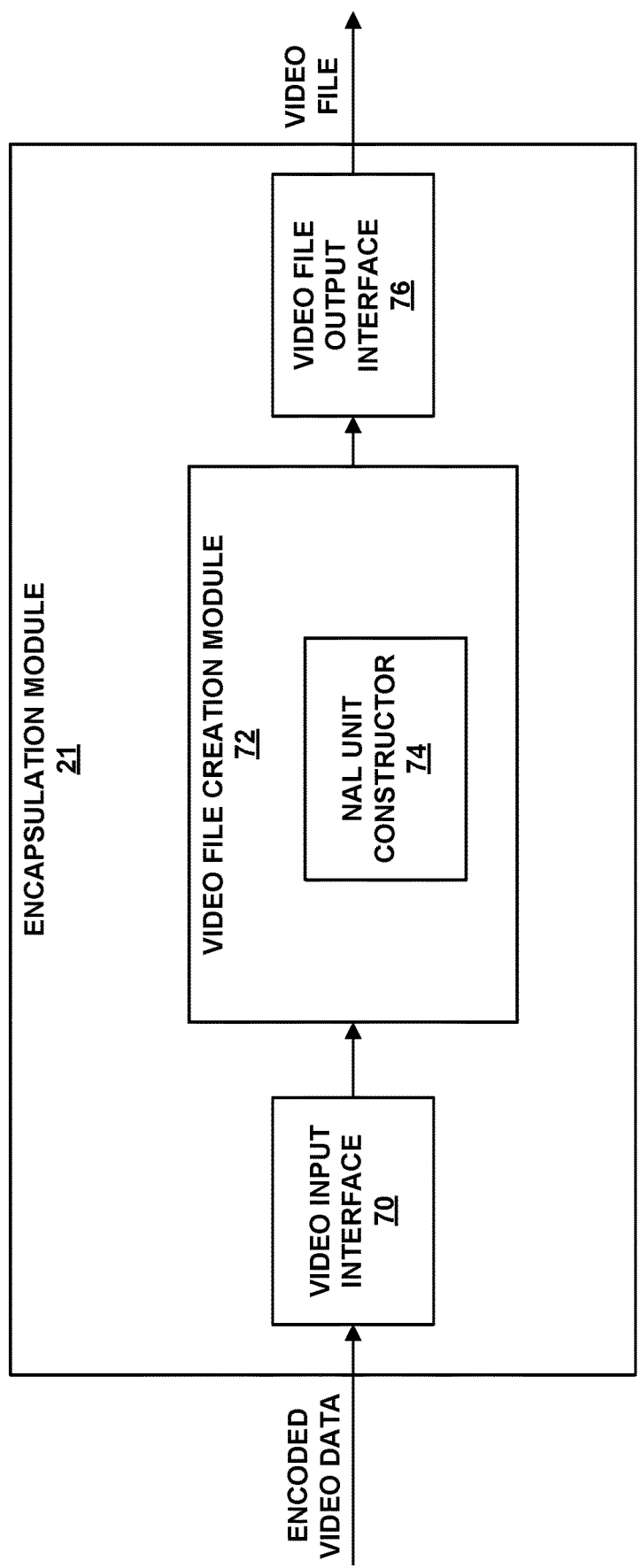
FIG. 6 is a block diagram illustrating components of an example encapsulation module that may implement the techniques described in this disclosure.

FIG. 6 is a block diagram illustrating components of an example encapsulation module 21. In the example of FIG. 6, encapsulation module 21 includes video input interface 70, video file creation module 72, and video file output interface 76. Video file creation module 70, in this example, includes network abstraction layer (NAL) unit constructor 74.

Video input interface 70 may receive coded video content. Video input interface 70 may receive coded video content from video encoder 20 or may retrieve encoded video content from a storage device. Coded video content may be coded according to the AVC or HEVC standard and may include samples of video content, parameter sets, and SEI messages. Upon receiving encoded video content, video input interface 70 may output the coded video content to video file creation module 72 for assembly into a media file. In some instances, video input interface 70 may facilitate the assembly of a media file by organizing or buffering coded video content before it is output to video file creation module 72.

In general, video file creation module 72 may generate a video file including the received coded video content. In one example, video file creation module 72 may create a video file, such as multiview with depth media file 142 described with respect to FIG. 1. Video file creation module 72 may correspond to a control unit including hardware, software, and/or firmware configured to perform the functions and procedures attributed thereto. The control unit may further perform the functions attributed to encapsulation module 21 generally. For examples in which video file creation module 72 is embodied in software and/or firmware, encapsulation module 21 may include a computer-readable medium comprising instructions for video file creation module 72 and a processing unit to execute the instructions. Sub-modules of video file creation module 72 (NAL unit constructor 74 in this example) may be implemented as individual hardware modules and/or software modules, and may be functionally integrated or further separated into additional sub-modules. Video file creation module 72 may correspond to any suitable processing unit or processing circuitry, such as, for example, one or more microprocessors, application-specific integrated circuits (ASICs), field programmable gate arrays (FPGAs), digital signal processors (DSPs), or any combination thereof. Video file creation module 72 may further include a non-transitory computer-readable medium storing instructions for NAL unit constructor 74, as well as a processor for executing the instructions.

In one example, video file creation module 72 may be configured to output encoded video data according to a file format that can store video streams containing multiple coded views with depth, wherein properties and relations of depth views may be signaled in the file.

Video file creation module 72 may be configured to implement techniques described in this disclosure. For example, video file creation module 72 may compose a media file having a new value of the syntax element Compressorname.

Compressorname as defined in a base class VisualSampleEntry may indicate the name of the compressor used with the value "\0123VC Coding" being recommended for a file containing 3DV (such as MVC+D) video streams. Syntax element Compressorname may be further defined according to AVCFF or HEVCFF.

In addition to the example syntax and semantics described above, a file format used by video file creation module 72 may include additional constraints with respect to a 3VC decoder configuration record. According to techniques described herein, the syntax element MVCDecoderConfigurationRecord may be structurally identical to a syntax element AVCDecoderConfigurationRecord. However, one or more reserved bits preceding and succeeding the lengthSizeMinusOne field are re-defined. An example syntax is as follows:

In some examples, the syntax structure of 3VCDecoderConfigurationRecord may be exactly the same as MVCDecoderConfigurationRecord. When an AVC decoder configuration record (as defined in clause 5.3.3.1 of ISO/IEC 14496-15) is used for a stream that can be interpreted as a 3VC stream, the AVC decoder configuration record may reflect the properties of the AVC compatible base view. For example, the AVC decoder configuration record may contain only parameter sets used for decoding the AVC base view.

When the MVC decoder configuration record (as defined in ISO/IEC 14496-15) is used for a stream that can be interpreted as an MVC or a 3VC stream, the MVC decoder configuration record shall reflect the properties of an MVC compatible bitstream subset. That is, for example, the MVC decoder configuration record may contain only parameter sets used for decoding the MVC compatible bitstream subset. An MVC compatible subset may be, for example, a bitstream subset with only the texture views.

A parameter set stream may be used with 3VC streams, as with AVC or MVC streams. In such an example, parameter sets shall not be included in the decoder configuration record. Sequence parameter sets (SPSs), including subset sequence parameter sets, may be numbered in order of storage from 1 to numOfSequenceParameterSets or numOfPictureParameterSets, respectively. SPSs and picture parameter sets (PPSs) stored in this record in a file may be referenced using this 1-based index by the InitialParameterSetBox.

The semantics of fields AVCProfileIndication, profile_compatibility, and AVCLevelIndication may differ from the MVCDecoderConfigurationRecord as follows. AVCProfileIndication, profile_compatibility, and AVCLevelIndication, if non-zero, must have values such that a conforming 3VC decoder is able to decode bitstreams conforming to the profile, level, and profile compatibility flags indicated in any of the SPSs or subset SPSs contained in this record.

The semantics of other fields may be as follows, or, if not present, as defined for an MVCDecoderConfigurationRecord: numOfSequenceParameterSets indicates the number of SPSs and subset SPSs that are used for decoding the 3VC elementary stream. The syntax element SequenceParameterSetNALUnit may contain a SPS or subset SPS NAL unit as specified in Annex I of ISO/IEC 14496-10. SPSs shall occur in order of ascending parameter set identifier with gaps being allowed. Subset SPSs shall occur in order of ascending

```
aligned(8) class MVCDecoderConfigurationRecord {
    unsigned int(8) configurationVersion = 1;
    unsigned int(8) AVCProfileIndication;
    unsigned int(8) profile_compatibility;
    unsigned int(8) AVCLevelIndication;
    bit(1) complete_representation;
    bit(1) explicit_au_track;
    bit(4) reserved = '1111'b;
    unsigned int(2) lengthSizeMinusOne;
    bit(1) reserved = '0'b;
    unsigned int(7) numOfSequenceParameterSets;
    for (i=0; i< numOfSequenceParameterSets; i++) {
        unsigned int(16) sequenceParameterSetLength;
        bit(8*sequenceParameterSetLength) sequenceParameterSetNALUnit;
    }
    unsigned int(8) numOfPictureParameterSets;
    for (i=0; i< numOfPictureParameterSets; i++) {
        unsigned int(16) pictureParameterSetLength;
        bit(8*pictureParameterSetLength) pictureParameterSetNALUnit;
    }
}
``` parameter set identifier with gaps being allowed. Any SPS shall occur before all the subset SPSs, if any.

Video file creation module 72 may also create a media file for 3VC tracks with AVC, MVC, and depth NAL units. The two sample entry types are defined as '3vc1' and '3vc2.' Example definitions for sample entries for MVC and 3VC are provided as follows. Sample entry types 'avc1,' 'avc2,' 'mvc1,' 'mvc2,' '3vc1,' and '3vc2' may be contained within a Sample Table Box ('stbl'), such as Sample Table Box 162 of FIG. 1. In some examples, having one of the avc1, avc2, mvc1, mvc2, 3vc1 and 3vc2 sample entry types in a media file, such as multiview with depth media file 142, is mandatory. In some examples, one or more sample entries may be present in multiview with depth media file 142.

Video file creation module 72 may include one of an AVC Configuration Box, an MVC Configuration Box, and a 3VC Configuration Box. When present, an AVC Configuration Box may document the Profile, Level and Parameter Set information pertaining to the AVC compatible base view as defined by an AVCDecoderConfigurationRecord. When present, an MVC Configuration Box may document the Profile, Level and Parameter Set information pertaining to the entire MVC stream as defined by the MVCDecoderConfigurationRecord. When present, a 3VC Configuration Box, such as 3VC Configuration Box 168 of FIG. 1, may document the Profile, Level, and Parameter Set information pertaining to the entire 3VC stream as defined by the 3VCDecoderConfigurationRecord, stored in 3VC Configuration Box 168.

For AVC sample entries 'avc1' and 'avc2,' width and height fields in the sample entry may document an AVC base layer. For MVC sample entries 'mvc1' and 'mvc2,' as well as 3VC sample entries '3vc1' and '3vc2,' width and height included in the sample entry may document the resolution achieved by decoding any single texture view of the entire MVC or 3VC stream. For 3VC sample entries, the depth_width and depth_height in 3VC Depth Resolution Box 170 may document the resolution achieved by decoding any single depth view of the entire 3VC stream.

In some examples, a lengthSizeMinusOne field in the AVC, MVC, and 3VC configurations in any given sample entry shall have the same value.

A priority assignment uniform resource identifier (URI) provides a name (in the URI space) of a method used to assign priority_id values. When it occurs in an AVC, an MVC or a 3VC sample entry, exactly one URI shall be present, that documents the priority_id assignments in the entire AVC, MVC, or 3VC stream. The URI is treated here as a name only; it should be de-referenceable, though this is not required. File readers may be able to recognize some methods and thereby know what stream extraction operations based on priority_id would do.

Some requirements for sample entry types 'avc1' and 'avc2' as documented in ISO/IEC 14496-15, section 6.5.3.1.1, may also apply here.

When present in an AVC, an MVC, or a 3VC sample entry, ViewScalabilityInfoSEIBox, ViewIdentifierBox (such as View Identifier Box 172), IntrinsicCameraParametersBox, ExtrinsicCameraParametersBox, 3VCScalabilityInformationSEIBox (such as 3VC Scalability Information SEI Box 166), MPEG4BitRateBox and MPEG4ExtensionDescriptorsBox apply to the entire AVC, MVC or 3VC stream. Example box types that may be included in one or both of sample entry '3vc1' and '3vc2' include an Intrinsic Camera Parameters Box ('icam'), Extrinsic Camera Parameters Box ('ecam'), and a View Identifier Box ('vwid').

For an MVC stream, the Compressorname in the base class VisualSampleEntry indicates the name of the compressor used, with the value "\012MVC Coding" (\012 is 10, the length of the string "MVC coding" in bytes). Similarly, for a 3VC stream, the Compressorname in the base class VisualSampleEntry indicates the name of the compressor used, with the value "\0123VC Coding" (\012 is 10, the length of the string "3VC coding" in bytes).

In some examples, one or more parameter sets required to decode a NAL unit that is present in the sample data of a video stream, either directly or by reference from an extractor, shall be present in the decoder configuration of that video stream or in the associated parameter set stream (if used).

Table 2 provides an example of possible uses of sample entries for AVC, MVC, and 3VC tracks. That is, Table 2 shows possible uses of sample entries when an AVC, an MVC, or a 3VC elementary stream is stored in one or more tracks, configurations, and the MVC tools that may also be used (excluding timed metadata, which is always used in another track). Table 2 includes the four character coded box type of sample entries, an indication of which configuration records pertain to the sample entries, and a meaning of the sample entries.

TABLE 2

Use of sample entries for AVC, MVC and 3VC tracks

| sample entry name | with configuration records | Meaning |
| --- | --- | --- |
| 'avc1' | AVC Configuration Only | A plain AVC track with AVC NAL units only; Extractors, aggregators, and tier grouping shall not be present. |
| 'avc1' | AVC and MVC Configurations | An MVC track with both AVC and MVC NAL units; Aggregators and extractors may be present; Aggregators shall not contain but may reference AVC NAL units; Tier grouping may be present. |
| 'avc1' | AVC, MVC, and 3VC Configurations | A 3VC track with AVC, MVC and depth NAL units; Aggregators and extractors may be present; Aggregators shall not contain but may reference AVC NAL units; Tier grouping may be present. |
| 'avc2' | AVC Configuration Only | A plain AVC track with AVC NAL units only; Extractors may be present; Aggregators may be present to contain and reference AVC NAL units; Tier grouping may be present. |

TABLE 2-continued

Use of sample entries for AVC, MVC and 3VC tracks

| sample entry name | with configuration records | Meaning |
|---|---|---|
| 'avc2' | AVC and MVC Configurations | An MVC track with both AVC NAL units and MVC NAL units; Extractors may be present and used to reference both AVC and MVC NAL units; Aggregators may be present to contain and reference both AVC and MVC NAL units; Tier grouping may be present. |
| 'mvc1' | MVC Configuration Only | An MVC track without AVC NAL units; Aggregators and tier grouping may be present. |
| 'mvc1' | MVC and 3VC Configurations | A 3VC track without AVC NAL units but with MVC and depth NAL units; Aggregators and tier grouping may be present. |
| 'mvc2' | MVC Configuration Only | An MVC track without AVC NAL units; Extractors, aggregators and tier grouping may be present. |
| 'mvc2' | MVC and 3VC Configurations | A 3VC track without AVC NAL units but with MVC and depth NAL units; Extractors, aggregators and tier grouping may be present. |
| '3vc1' | 3VC Configuration Only | A 3VC track with depth NAL units only; Aggregators and tier grouping may be present. |
| '3vc2' | 3VC Configuration Only | A 3VC track with depth NAL units only; Extractors, aggregators and tier grouping may be present. |

The following provides an example syntax structure for MVC and 3VC sample entries:

```
class MVCConfigurationBox extends Box('mvcC') {
    MVCDecoderConfigurationRecord( ) MVCConfig;
}
class ViewScalabilityInformationSEIBox extends Box('vsib', size)
{
    unsigned int(8*size-64)   viewscalinfosei;
}
class 3VCDepthResolutionBox extends Box('3dpr')
{
    unsigned int(16) depth_width;
    unsigned int(16) depth_height;
}
class 3VCConfigurationBox extends Box('3vcC') {
    3VCDecoderConfigurationRecord 3VCConfig;
    3VCDepthResolutionBox 3vcDepthRes; //Optional
}
class 3VCScalabilityInformationSEIBox extends Box('3sib', size)
{
    unsigned int(8*size-64)   3vcscalinfosei;
}
class AVCMVCSampleEntry( ) extends AVCSampleEntry ('avc1' or 'avc2'){
    ViewScalabilityInformationSEIBox  mvcscalinfosei;          // optional
    ViewIdentifierBox    view_identifiers;        // optional
    MVCConfigurationBox  mvcconfig;               // optional
    MVCViewPriorityAssignmentBox  view_priority_method;        // optional
    IntrinsicCameraParametersBox  intrinsic_camera_params;     // optional
    ExtrinsicCameraParametersBox  extrinsic_camera_params;     // optional
    3VCConfigurationBox  3vcconfig; // optional
    3VCScalabilityInformationSEIBox  3vcscalinfosei;      // optional
}
class MVCSampleEntry( ) extends VisualSampleEntry ('mvc1' or 'mvc2'){
    MVCConfigurationBox   mvcconfig;              // mandatory
    ViewScalabilityInformationSEIBox  mvcscalinfosei;          // optional
    ViewIdentifierBox   view_identifiers;         // mandatory
    MPEG4BitRateBox bitrate;                      // optional
    MPEG4ExtensionDescriptorsBox descr;           // optional
    MVCViewPriorityAssignmentBox  view_priority_method;        // optional
    IntrinsicCameraParametersBox  intrinsic_camera_params;     // optional
    ExtrinsicCameraParametersBox  extrinsic_camera_params      // optional
    3VCConfigurationBox  3vcconfig; // optional
    3VCScalabilityInformationSEIBox  3vcscalinfosei;      // optional
}
class 3VCSampleEntry( ) extends VisualSampleEntry ('3vc1' or '3vc2'){
    3VCConfigurationBox  3vcconfig;    // mandatory
    3VCScalabilityInformationSEIBox  3vcscalinfosei;      // optional
    ViewIdentifierBox   view_identifiers;         // mandatory
    MPEG4BitRateBox bitrate;                      // optional
```

```
    MPEG4ExtensionDescriptorsBox descr;            // optional
    MVCViewPriorityAssignmentBox view_priority_method;    // optional
    IntrinsicCameraParametersBox intrinsic_camera_params;  // optional
    ExtrinsicCameraParametersBox extrinsic_camera_params   // optional
}
```

The following provides example syntax elements for MVC and 3VC sample entries. A syntax element depth_width and depth_height may give, in pixels, the values of the width and height, respectively, of the coded depth view components in the stream to which the sample entry containing the 3VCDepthResolutionBox( ) (such as 3VC Depth Resolution Box 170) applies. A syntax element 3vcDepthRes may contain the width and height of the coded depth view components in the stream to which the sample entry applies. When not present, the width and height of the coded depth view components may be inferred to be the same as the width and height of the coded texture view components.

The syntax element mvcscalinfosei may contain an SEI NAL unit containing only a view scalability information SEI message as specified in ISO/IEC 14496-10 Annex H. The 'size' field of a container box ViewScalabilityInformationSEIBox shall not be equal to 0 or 1.

Another syntax element, 3vcscalinfosei, may contain an SEI NAL unit containing only a 3DVC scalability information SEI message as specified in ISO/IEC 14496-10 Annex I. The 'size' field of the container box 3VCScalabilityInformationSEIBox shall not be equal to 0 or 1.

For MVC+D video streams, video file creation module 72 may also compose a 3VC scalability Information SEI Message box, such as 3VC scalability Information SEI Message box 166 of FIG. 1. 3VC scalability Information SEI Message box 166 may contain a 3DVC scalability information SEI message defined in the MVC+D codec specification.

Video file creation module 72 may also compose a View Identifier box, such as View Identifier box 172 of FIG. 1, according to techniques described herein. Video file creation module 72 may compose View Identifier box 172 to indicate, for each view included in the track, the presence of texture and depth views in the track and in the stream. Further, video file creation module 72 may compose View Identifier box 172 to indicate how a texture view and depth view of a reference view are required for decoding a specific view.

Further details for View Identifier box 172 are as follows. The four character coded box type for View Identifier box 172 may be 'vwid.' View Identifier box 172 may be contained in any sample entry (for example, 'avc1,' 'avc2,' 'mvc1,' 'mvc2,' '3vc1,' and '3vc2') or in a multigroup entry. In some examples, the View Identifier box has to be included exactly once for each of the sample entries 'mvc1,''mvc2, ''3vc1,' '3vc2,' and the primary group definition in Multiview Group entries. In some examples, no View Identifier box 172 is included for non-primary group definitions in Multiview Group entries.

When included in a sample entry, View Identifier box 172 indicates the views included in a track. When included in a Multiview Group entry, View Identifier box 172 indicates the views included in a respective tier. View Identifier box 172 also indicates a view order index for each listed view. Additionally, View Identifier box 172 includes the minimum and maximum values of temporal_id included in the track or tier when View Identifier box 172 is included in a sample entry or Multiview Group entry, respectively. Moreover, View Identifier box 172 may indicate one or more referenced views required for decoding the views included in the track or tier. For 3VC streams, View Identifier box 172 may indicate, for each of the view included in the track, the presence of texture and/or depth in the track and in the stream.

One example syntax for View Identifier box 172 is as follows:
class ViewIdentifierBox extends FullBox version=0, flags)

```
{
    unsigned int(2) reserved6 = 0;
    unsigned int(3) min_temporal_id;
    unsigned int(3) max_temporal_id;
    unsigned int(16)   num_views;
    for (i=0; i<num_views; i++) {
        unsigned int(6) reserved1 = 0;
        unsigned int(10) view_id[i];
        unsigned int(6) reserved2 = 0;
        unsigned int(10) view_order_index;
        unsigned int(1)          texture_in_stream[i];
        unsigned int(1)          texture_in_track[i];
        unsigned int(1)          depth_in_stream[i];
        unsigned int(1)          depth_in_track[i];
        unsigned int(2)          base_view_type;
        unsigned int(10)         num_ref_views;
        for (j = 0; j < num_ref_views; j++) {
            unsigned int(4)       reserved5 = 0;
            unsigned int(2)       dependent_component_idc[i][j];
            unsigned int(10)      ref_view_id[i][j];
        }
    }
}
```

Some example semantics for View Identifier box 172 are provided as follows. Two syntax elements min_temporal_id and max_temporal_id may have a minimum and maximum value, respectively, of a temporal_id syntax element that is present in a NAL unit header extension of NAL units mapped to the track or tier when View Identifier box 172 is included in a sample entry or Multiview Group entry, respectively. For AVC streams, min_temporal_id and max_temporal_id take the value that is, or would be, in the prefix NAL unit.

A syntax element num_views, when View Identifier box 172 is present in a sample entry, may indicate the number of views included in the track. When View Identifier box 172 is present in a Multiview Group entry, num_views may indicate the number of views included in the respective tier.

Another syntax element view_id[i] may indicate the value of the view_id syntax element in the NAL unit header extension of a view included in the track or tier when View Identifier box 172 is included in a sample entry or Multiview Group entry, respectively.

Syntax element view_order_index may indicate the value of an order index value (VOIdx) variable, as specified in Annex H of ISO/IEC 14496-10, for a view included in the track or tier when View Identifier box 172 is included in a sample entry or Multiview Group entry, respectively.

A syntax element texture_in_stream[i] is introduced, where texture_in_stream[i] equal to 1 may indicate that the texture view for the view with view_id[i] is present in the stream. The value indicates that the texture view for the view with view_id[i] may not be present in the stream.

Similarly, a syntax element texture_in_track[i] is introduced, where texture_in_track[i] equal to 1 may indicate that the texture view for the view with view_id[i] is present in the track. The value may indicate that the texture view for the view with view_id[i] is not present in the track. In some examples, when texture_in_stream[i] is equal to 0, the value of texture_in_track[i] shall be equal to 0.

Another syntax element depth_in_stream[i] is introduced, where depth_in_stream[i] equal to 1 may indicate that the depth view for the view with view_id[i] is present in the stream. The value may indicate that the depth view for the view with view_id[i] is not present in the stream. In some examples, when texture_in_stream[i] is equal to 0, the value of depth_in_stream[i] shall be equal to 1.

A syntax element depth_in_track[i] is introduced, where depth_in_track[i] equal to 1 may indicate that the depth view for the view with view_id[i] is present in the track. The value may indicate that the depth view for the view with view_id [i] is not present in the track. In some examples, when depth_in_stream[i] is equal to 0, the value of depth_in_track [i] shall be equal to 0. In some examples, when texture_in_ track[i] is equal to 0, the value of depth_in_track[i] shall be equal to 1.

Another syntax element base_view_type may indicate whether the view is a base view (virtual or not). Syntax element base_view_type may take the following values: 0 indicates that the view is neither a base view nor virtual base view; 1 shall be used to label the non-virtual base view of the MVC bitstream; 2 is a reserved value and shall not be used (although may be used at a later time); and 3 indicates that the view with view_id[i] is a virtual base view. The respective independently coded non-base view with view_id[i] may reside in another track. When base_view_type is equal to 3, the subsequent num_ref_views shall be equal to 0.

A further syntax element num_ref_views may indicate the number of views that may be directly or indirectly referenced by the view with view_id[i].

Another syntax element dependent component idc[i][j] is introduced that may indicate how the texture view and depth view of a $j^{th}$ reference view are required for decoding the view with view_id[i]. If the value is equal to 0, only the texture view of the reference view may be required. If the value is equal to 1, only the depth view of the reference view may be required. If the value is equal to 2, both texture view and depth view of the reference view may be required. The value of 3 is reserved.

Another syntax element ref_view_id[i][j] may indicate the view identifier of a $j^{th}$ view that may be directly or indirectly referenced by the view with view_id[i], that is, that may be required for decoding of the view with view_id [i]. If a view is required for decoding the view with view_id[i], it may be listed as one of ref_view_id[i][j]. When View Identifier box 172 is included in a sample entry, it may be recommended to indicate the referenced views for both anchor and non-anchor access units in the same sample entry.

Further, in some examples, video file creation module 72 may provide an explicit indication in a 3VC Depth Resolution box, such as 3VC Depth Resolution box 170 of FIG. 1, of the spatial resolutions of depth views. The 3VC Depth Resolution box 170 may be included in a 3VC Configuration box, such as 3VC Configuration box 168 of FIG. 1. In some examples, 3VC Configuration box 168 has to include a 3VC decoder configuration record, and can be included in a sample entry, but must be included in a sample entry of type '3vc1' or '3vc2.'

In some aspects, video file creation module 72 further composes video files where texture views and depth views are stored in separate tracks. An MVC or a 3VC stream may be represented by one or more video tracks in a file (such as video data streams 146 of FIG. 1). Each track may represent one or more views of the stream. For a track in a file storing a 3VC video stream, such as multiview with depth media file 142, the track may contain texture only, depth only, or both texture and depth.

In some examples, there may be a minimal set of one or more tracks that, when taken together, contain the complete set of encoded information. All these tracks may have a flag, "complete_representation," set in all of their sample entries. The group of tracks that forms complete encoded information may be called a "complete subset." The track that has the flag "complete_representation" set and contains NAL units of a base view with temporal_id equal to 0 may be nominated as a 'base view track.' All the other tracks that are part of the same stream may be linked to this base view track by means of a track reference of type 'sbas' (view base). The complete encoded information can be retained when the tracks included in the "complete subset" are retained; all other tracks shall be subsets, copies or re-orderings of the complete subset.

All tracks sharing the same base view track may also share the same timescale. For some examples with 3VC streams, all the tracks containing the texture view and the depth view of a particular view share the same timescale. The texture view and the depth view of a particular view may have the same value of view_id (hence also the same value of view order index) and may be referred to as being associated with each other.

If a view represented by a track uses another view represented by another track as an inter-view prediction reference, a track reference of type 'scal' shall be included in the track referring to the source track for inter-view prediction.

In some examples for 3VC streams, if a depth view is stored in a different track than the track containing the texture view associated with the depth view, a track reference of type 'deps' is included in the track containing the depth view, referring to the track containing the texture view. The presence of track reference deps' indicates that the current track contains the depth view that is associated with a texture view in the referenced track.

In some examples, after video file creation unit 72 generates a video file, video file creation unit 72 passes the video file to video file output interface 76. Video file output interface 76 outputs the video file, for example, to output interface 22 of source device 20. In some examples, video file output interface 76 outputs the video file to a storage medium of source device 20 or storage device 32.

Figure 7:
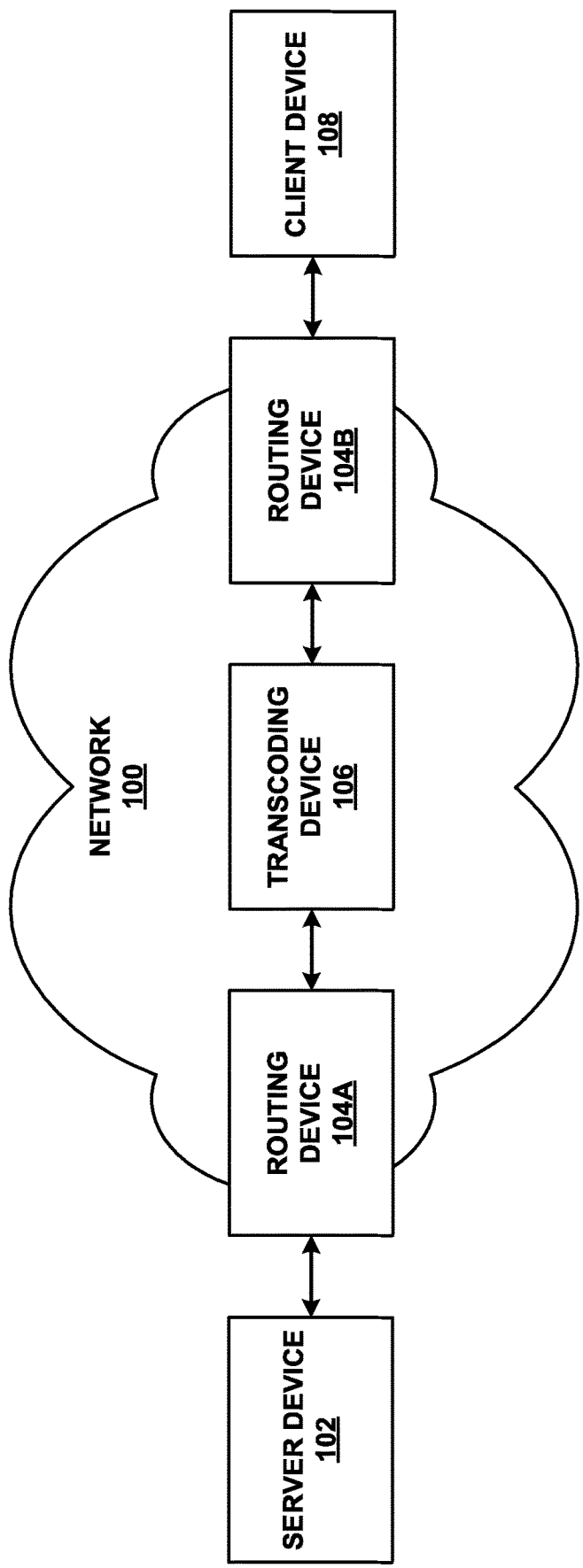
FIG. 7 is a block diagram illustrating an example set of devices that form part of network that may implement the techniques described in this disclosure.

FIG. 7 is a block diagram illustrating an example set of devices that form part of network 100 that may implement the techniques described in this disclosure. In this example, network 100 includes routing devices 104A, 104B (routing devices 104) and transcoding device 106. Routing devices 104 and transcoding device 106 are intended to represent a small number of devices that may form part of network 100. Other network devices, such as switches, hubs, gateways, firewalls, bridges, and other such devices may also be included within network 100. Moreover, additional network devices may be provided along a network path between server device 102 and client device 108. Any such devices may comprise an encoder or a decoder that may implement one or more techniques described herein. Moreover, network devices may comprise a MANE that does not necessarily include full encoding or decoding capabilities, and the MANE may also implement one or more techniques described herein. Server device 102 may correspond to source device 12 of FIG. 3, while client device 108 may correspond to destination device 14 of FIG. 3, in some examples.

In general, routing devices 104 implement one or more routing protocols to exchange network data through network 100. In some examples, routing devices 104 may be configured to perform proxy or cache operations. Therefore, in some examples, routing devices 104 may be referred to as proxy devices. In general, routing devices 104 execute routing protocols to discover routes through network 100. By executing such routing protocols, routing device 104B may discover a network route from itself to server device 102 via routing device 104A.

Through network 100, server device 102 may provide client device 108 with one or more media files composed according to techniques described herein. In other examples, client device 108 provides server device 102 one or more media files composed according to techniques described herein through network 100.

Figure 8:
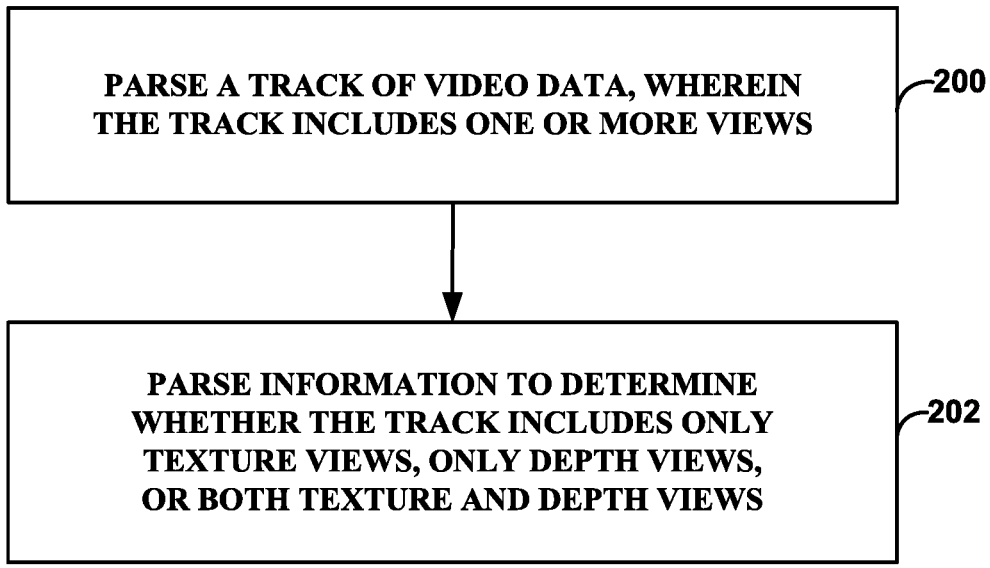
FIG. 8 is a flowchart illustrating an example method of parsing a media file containing multiview video content that indicates the presence of texture and depth views according to techniques described in this disclosure.

FIG. 8 is a flowchart illustrating an example method of parsing a media file containing multiview video content according to techniques described in this disclosure. The process described in FIG. 8 may be performed by a video coding device which may include any combination of destination device 20 and decapsulation module 29 described herein. A video coding device may parse a track of video data, wherein the track includes one or more views (200). For example, decapsulation module 29 may obtain a media file containing multiple coded views plus depth, such as multiview with depth media file 142 from source device 12. The video coding device may parse information to determine whether the track includes only texture views, only depth views, or both texture and depth views (202). For example, decapsulation module 29 may parse information from multiview with depth media file 142 to determine whether at least one of the tracks included in multiview with depth media file 142 contains texture views, depth views, or both texture and depth views.

In some examples, parsing information further comprises parsing a View Identifier box from at least one of a sample entry and a multi-view group entry, wherein the at least one of the sample entry and the multi-view group entry are associated with the track. For example, decapsulation module 29 may parse information from View Identifier box 172 to determine, for each view included in the track, whether the view is a texture view or a depth view. Decapsulation module 29 may parse View Identifier box 172 to further determine whether a texture view or a depth view of a reference view is required for decoding a specific view in the track.

Decapsulation module 29 may parse another, second set of video data based on the first video data and further parse information to determine whether the first texture view, the first depth view, or both the first texture and first depth view of the first video data are used to decode the second video data.

In another example, the process includes parsing a supplemental enhancement information (SEI) message box to determine a three dimensional scalability information SEI message associated with one or more of the views. That is, decapsulation module 29 may parse an SEI message box, such as 3VC Scalability Information SEI Message box 166, to obtain information from an SEI message of one or more of the views.

In examples where the track contains one or more depth views, the process may further include parsing a 3VC Depth Resolution box to determine a spatial resolution of the one or more depth views. For example, decapsulation module 29 parses 3VC Depth Resolution box 170 to determine a spatial resolution of a depth view included in multiview with depth media file 142. In some examples, decapsulation module 29 parses 3VC Depth Resolution box 170 from 3VC Configuration box 168. In other examples, decapsulation module 29 parses 3VC Depth Resolution box 170 directly from a sample entry. Decapsulation module 29 may also parse a 3VC decoder configuration record, 3VCDecoderConfigurationRecord which includes semantics that indicate characteristics related to a 3DV video stream, such as an MVC+D video stream. The process may also include parsing a three-dimensional video coding (3VC) decoder configuration record to determine a width and a height of a depth view included in the track.

In some examples, the track is a first track, wherein the first track includes one of a depth view of a view and a texture view of the view, and the process further includes parsing a second track of video data, wherein the second track includes the one of the depth view of the view and the texture view of the view that is not included in the first track. The process may further include parsing a track reference for the first track that references the second track, wherein the track reference includes at least one track reference type that indicates one of that the first track includes the depth view that is associated with the texture view stored in the second track (e.g., the track reference type is 'deps'), that the first track depends on the texture view stored in the second track (e.g., the track reference type is 'tref'), and that the first track depends on a depth view stored in the second track (e.g., the track reference type is 'dref').

In examples where the track is a three-dimensional video coding (3VC) track the process may further include parsing a 3VC decoder configuration record, wherein the 3VC decoder configuration record indicates a configuration record for a matching sample entry of the video data. In another example, where the track is a 3VC track that includes one or more depth network abstraction layer (NAL) units, the process includes parsing at least one of a sample entry type '3vc1' that allows extractors and a sample entry type '3vc2' that disallows extractors. In further examples, the process may contain one or more of the techniques described in this disclosure.

Figure 9:
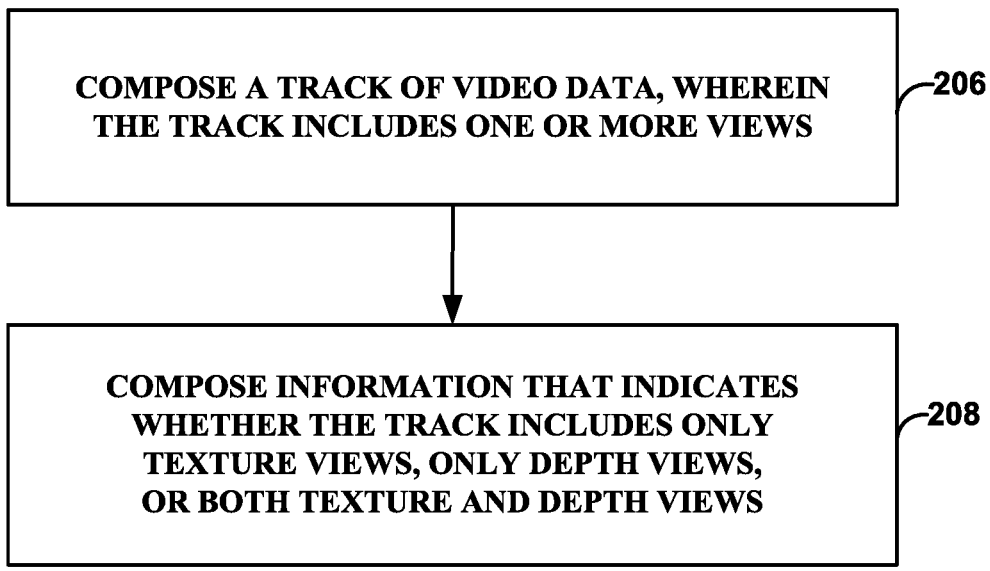
FIG. 9 is a flowchart illustrating an example method of composing a media file containing multiview video content to indicate the presence of texture and depth views according to techniques described in this disclosure.

FIG. 9 is a flowchart illustrating an example method of composing a media file containing multiview video content to indicate the presence of texture and depth views according to techniques described in this disclosure. The process described in FIG. 9 may be performed by a video coding device which includes encapsulation module 21 described herein. A video coding device may compose a track of video data, wherein the track includes one or more views (206). For example, encapsulation module 21 may obtain a video data from video encoder 21. The video coding device may compose information that indicates whether the track includes only texture views, only depth views, or both texture and depth views (208). For example, encapsulation module 21 may compose information into multiview with depth media file 142 to indicate whether at least one of the tracks included in multiview with depth media file 142 contains texture views, depth views, or both texture and depth views. Encapsulation module 21 may compose a media file containing multiple coded views plus depth, such as multiview with depth media file 142, according to techniques described herein.

In some examples, composing information further comprises composing a View Identifier box in at least one of a sample entry and a multi-view group entry, wherein the at least one of the sample entry and the multi-view group entry are associated with the track. For example, encapsulation module 21 may compose information into View Identifier box 172 to indicate, for each view included in the track, whether the view is a texture view or a depth view. Encapsulation module 21 may compose View Identifier box 172 to further indicate whether a texture view or a depth view of a reference view is required for decoding a specific view in the track.

Encapsulation module 21 may compose another, second set of video data based on the first video data and further compose information to indicate whether the first texture view, the first depth view, or both the first texture and first depth view of the first video data may be used to decode or parse the second video data.

In another example, the process includes composing a supplemental enhancement information (SEI) message box to indicate a three dimensional scalability information SEI message associated with one or more of the views. That is, encapsulation module 21 may compose an SEI message box, such as 3VC Scalability Information SEI Message box 166, to provide information in an SEI message of one or more of the views.

In examples where the track contains one or more depth views, the process may further include composing a 3VC Depth Resolution box to indicate a spatial resolution of the one or more depth views. For example, encapsulation module 21 composes 3VC Depth Resolution box 170 to indicate a spatial resolution of a depth view included in multiview with depth media file 142. In some examples, encapsulation module 21 composes 3VC Depth Resolution box 170 in 3VC Configuration box 168. In other examples, encapsulation module 21 composes 3VC Depth Resolution box 170 directly in a sample entry. Encapsulation module 21 may also compose a 3VC decoder configuration record, 3VCDecoderConfigurationRecord, which includes semantics that indicate characteristics related to a 3DV video stream, such as an MVC+D video stream. The process may also include composing a three-dimensional video coding (3VC) decoder configuration record to determine a width and a height of a depth view included in the track.

In some examples, the track is a first track, wherein the first track includes one of a depth view of a view and a texture view of the view, and the process further includes composing a second track of video data, wherein the second track includes the one of the depth view of the view and the texture view of the view that is not included in the first track. The process may further include composing a track reference for the first track that references the second track, wherein the track reference includes at least one track reference type that indicates one of that the first track includes the depth view that is associated with the texture view stored in the second track (e.g., the track reference type is 'deps'), that the first track depends on the texture view stored in the second track (e.g., the track reference type is 'tref'), and that the first track depends on a depth view stored in the second track (e.g., the track reference type is 'dref').

In examples where the track is a three-dimensional video coding (3VC) track, the process may further include composing a 3VC decoder configuration record, wherein the 3VC decoder configuration record indicates a configuration record for a matching sample entry of the video data. In another example, where the track is a 3VC track that includes one or more depth network abstraction layer (NAL) units, the process includes composing at least one of a sample entry type '3vc1' that allows extractors and a sample entry type '3vc2' that disallows extractors. In further examples, the process may contain one or more of the techniques described in this disclosure.

Figure 10:
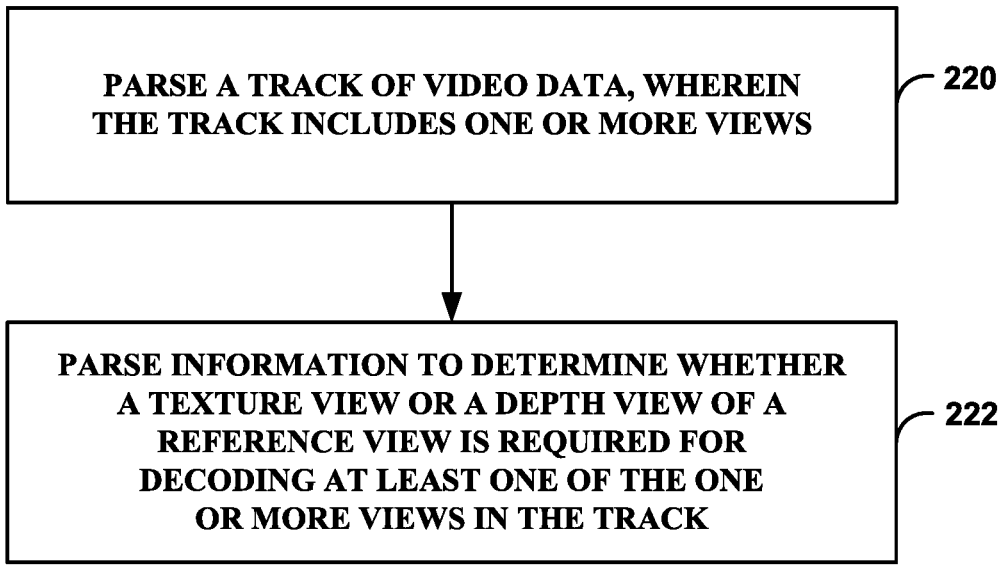
FIG. 10 is a flowchart illustrating an example method of parsing a media file containing multiview video that indicates dependency of views according to techniques described in this disclosure.

FIG. 10 is a flowchart illustrating an example method of parsing a media file containing multiview video that indicates dependency of views according to techniques described in this disclosure. The process described in FIG. 10 may be performed by a video coding device which includes decapsulation module 29 described herein. A video coding device may parse a track of video data, wherein the track includes one or more views (220). For example, decapsulation module 29 may obtain a media file containing multiple coded views plus depth, such as multiview with depth media file 142 from source device 12. The video coding device may parse information to determine whether a texture view or a depth view of a reference view is required for decoding one of the one or more views in the track (202). For example, decapsulation module 29 may parse information from multiview with depth media file 142 to determine whether a texture view or a depth view of a reference view is required for decoding one of the one or more views in the track included in multiview with depth media file 142.

In some examples, the process may further include decoding the second video data based on the first video data, wherein decoding the second video data includes decoding information that indicates whether a texture view, a depth view or both a texture and depth view of the first video data are used to decode the second video data.

In some examples, parsing information further comprises parsing a View Identifier box from at least one of a sample entry and a multi-view group entry, wherein the at least one of the sample entry and the multi-view group entry are associated with the track. For example, video decoder 30 may parse information from View Identifier box 172 to determine whether a texture view or a depth view of a reference view is required for decoding one of the one or more views in the track included in multiview with depth media file 142. In another example, decapsulation module 29 may parse information from View Identifier box 172 to determine whether the track includes only texture views, only depth views, or texture and depth views. In another example, decapsulation module 29 may parse information from View Identifier box 172 to determine, for each view included in the track, whether the view is a texture view or a depth view. Decapsulation module 29 may parse View Identifier box 172 to further determine whether a texture view or a depth view of a reference view is required for decoding a specific view in the track.

Decapsulation module 29 may parse another, second set of video data based on the first video data and further parse information to determine whether the first texture view, the first depth view, or both the first texture and first depth view of the first video data are used to decode the second video data.

In another example, the process includes parsing a supplemental enhancement information (SEI) message box to determine a three dimensional scalability information SEI message associated with one or more of the views. That is, decapsulation module 29 may parse an SEI message box, such as 3VC Scalability Information SEI Message box 166, to obtain information from an SEI message of one or more of the views.

In examples where the track contains one or more depth views, the process may further include parsing a 3VC Depth Resolution box to determine a spatial resolution of the one or more depth views. For example, decapsulation module 29 parses 3VC Depth Resolution box 170 to determine a spatial resolution of a depth view included in multiview with depth media file 142. In some examples, decapsulation module 29 parses 3VC Depth Resolution box 170 from 3VC Configuration box 168. In other examples, decapsulation module 29 parses 3VC Depth Resolution box 170 directly from a sample entry. Decapsulation module 29 may also parse a 3VC decoder configuration record, 3VCDecoderConfigurationRecord which includes semantics that indicate characteristics related to a 3DV video stream, such as an MVC+D video stream. The process may also include parsing a three-dimensional video coding (3VC) decoder configuration record to determine a width and a height of a depth view included in the track.

In some examples, the track is a first track, wherein the first track includes one of a depth view of a view and a texture view of the view, and the process further includes parsing a second track of video data, wherein the second track includes the one of the depth view of the view and the texture view of the view that is not included in the first track. The process may further include parsing a track reference for the first track that references the second track, wherein the track reference includes at least one track reference type that indicates one of that the first track includes the depth view that is associated with the texture view stored in the second track (e.g., the track reference type is 'deps'), that the first track depends on the texture view stored in the second track (e.g., the track reference type is 'tref', and that the first track depends on a depth view stored in the second track (e.g., the track reference type is 'dref').

In examples where the track is a three-dimensional video coding (3VC) track the process may further include parsing a 3VC decoder configuration record, wherein the 3VC decoder configuration record indicates a configuration record for a matching sample entry of the video data. In another example, where the track is a 3VC track that includes one or more depth network abstraction layer (NAL) units, the process includes parsing at least one of a sample entry type '3vc1' that allows extractors and a sample entry type '3vc2' that disallows extractors. In further examples, the process may contain one or more of the techniques described in this disclosure.

Figure 11:
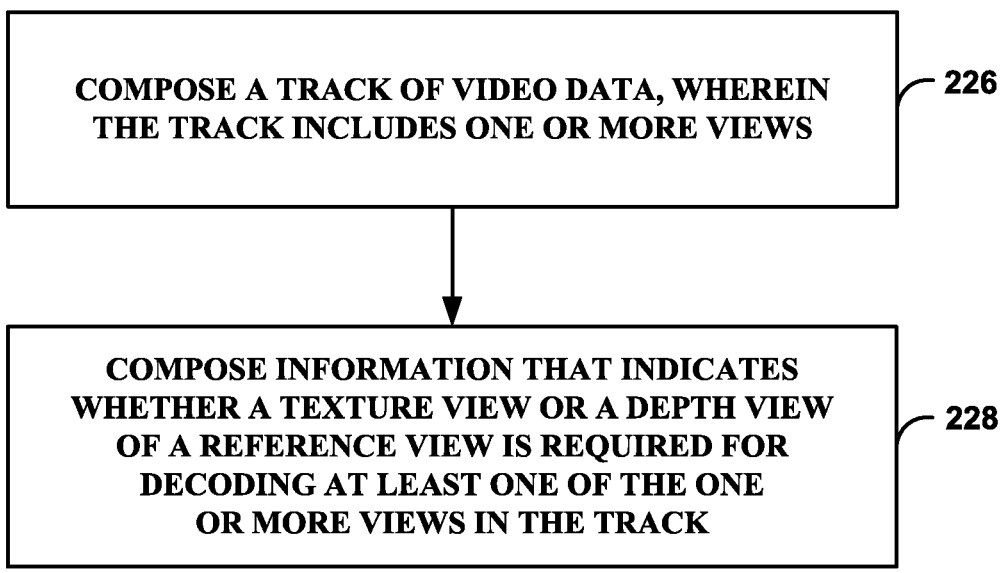
FIG. 11 is a flowchart illustrating an example method of composing a media file containing multiview video content to indicate dependency of views according to techniques described in this disclosure.

FIG. 11 is a flowchart illustrating an example method of composing a media file containing multiview video content to indicate dependency of views according to techniques described in this disclosure. The process described in FIG. 11 may be performed by a video coding device which includes encapsulation module 21 described herein. A video coding device may compose a track of video data, wherein the track includes one or more views (226). For example, encapsulation module 21 may obtain a video data from video encoder 21. The video coding device may compose information composing information that indicates whether a texture view or a depth view of a reference view is required for decoding one of the one or more views in the track (228). For example, encapsulation module 21 may compose information into multiview with depth media file 142 to indicate whether a texture view or a depth view of a reference view is required for decoding one of the tracks included in multiview with depth media file 142. Encapsulation module 21 may compose a media file containing multiple coded views plus depth, such as multiview with depth media file 142, according to techniques described herein.

In some examples, composing information further comprises composing a View Identifier box in at least one of a sample entry and a multi-view group entry, wherein the at least one of the sample entry and the multi-view group entry are associated with the track. For example, encapsulation module 21 may compose information into View Identifier box 172 to indicate, for each view included in the track, whether the view is a texture view or a depth view. Encapsulation module 21 may compose View Identifier box 172 to further indicate whether the track includes only texture views, only depth views, or texture and depth views. Encapsulation module 21 may compose View Identifier box 172 to further indicate, for each view included in the track, whether the view is a texture view or a depth view.

Encapsulation module 21 may compose another, second set of video data based on the first video data and further compose information to indicate whether the first texture view, the first depth view, or both the first texture and first depth view of the first video data are used to decode or parse the second video data.

In another example, the process includes composing a supplemental enhancement information (SEI) message box to indicate a three dimensional scalability information SEI message associated with one or more of the views. That is, encapsulation module 21 may compose an SEI message box, such as 3VC Scalability Information SEI Message box 166, to provide information in an SEI message of one or more of the views.

In examples where the track contains one or more depth views, the process may further include composing a 3VC Depth Resolution box to indicate a spatial resolution of the one or more depth views. For example, encapsulation module 21 composes 3VC Depth Resolution box 170 to indicate a spatial resolution of a depth view included in multiview with depth media file 142. In some examples, encapsulation module 21 composes 3VC Depth Resolution box 170 in 3VC Configuration box 168. In other examples, encapsulation module 21 composes 3VC Depth Resolution box 170 directly in a sample entry. Encapsulation module 21 may also compose a 3VC decoder configuration record, 3VCDecoderConfigurationRecord, which includes semantics that indicate characteristics related to a 3DV video stream, such as an MVC+D video stream. The process may also include composing a three-dimensional video coding (3VC) decoder configuration record to determine a width and a height of a depth view included in the track.

In some examples, the track is a first track, wherein the first track includes one of a depth view of a view and a texture view of the view, and the process further includes composing a second track of video data, wherein the second track includes the one of the depth view of the view and the texture view of the view that is not included in the first track. The process may further include composing a track reference for the first track that references the second track, wherein the track reference includes at least one track reference type that indicates one of that the first track includes the depth view that is associated with the texture view stored in the second track (e.g., the track reference type is 'deps'), that the first track depends on the texture view stored in the second track (e.g., the track reference type is 'tref'), and that the first track depends on a depth view stored in the second track (e.g., the track reference type is 'dref').

In examples where the track is a three-dimensional video coding (3VC) track, the process may further include composing a 3VC decoder configuration record, wherein the 3VC decoder configuration record indicates a configuration record for a matching sample entry of the video data. In another example, where the track is a 3VC track that includes one or more depth network abstraction layer (NAL) units, the process includes composing at least one of a sample entry type '3vc1' that allows extractors and a sample entry type '3vc2' that disallows extractors. In further examples, the process may contain one or more of the techniques described in this disclosure.

An alternative process of processing video data according to techniques described herein includes encoding first video data, wherein the first video data includes a texture view and a depth view. The process further includes encoding second video data based on the first video data, wherein encoding the second video data includes encoding information that indicates whether the texture view, the depth view or both the texture and depth view of the first video data are used to decode the second video data.

Figure 12:
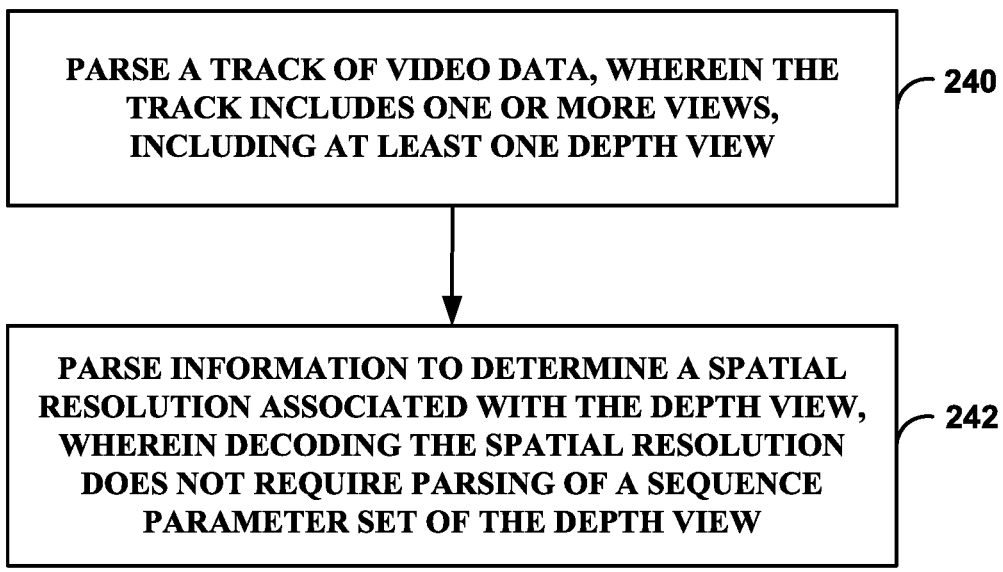
FIG. 12 is a flowchart illustrating an example method of parsing a media file containing multiview video to determine a spatial resolution of a depth view according to techniques described in this disclosure.

FIG. 12 is a flowchart illustrating an example method of parsing a media file containing multiview video to determine a spatial resolution of a depth view according to techniques described in this disclosure. The process described in FIG. 12 may be performed by a video coding device which includes decapsulation module 29 described herein. A video coding device may parse a track of video data, wherein the track includes one or more views, including at least one depth view (240). For example, decapsulation module 29 may obtain a media file containing multiple coded views plus depth, such as multiview with depth media file 142 from source device 12. The video coding device may parse information to determine a spatial resolution associated with the depth view, wherein decoding the spatial resolution does not require parsing of a sequence parameter set of the depth view (242). For example, decapsulation module 29 may parse information from multiview with depth media file 142 to determine a spatial resolution of the depth view stored in depth media file 142.

In some examples, parsing information further comprises parsing the spatial resolution from a 3VC Depth Resolution box from at least one of a 3VC Configuration box and directly from a sample entry. That is, in some examples, a 3VC Depth Resolution box, such as 3VC Depth Resolution box 170, is stored in a 3VC Configuration box, such as 3VC Configuration box 168, while in other examples, 3VC Depth Resolution box 170 is stored directly in a sample entry. The process may further comprise parsing a 3VC decoder configuration record from the 3VC Configuration box, wherein the 3VC Configuration box is included in at least one of a sample entry of type '3vc1' that allows extractors and a sample entry type '3vc2' that disallows extractors.

In some examples, decapsulation module 29 may also parse a 3VC decoder configuration record to determine a width and a height of the depth view. 3VCDecoderConfigurationRecord may include semantics that indicate characteristics related to a 3DV video stream, such as an MVC+D video stream. The process may also include parsing a three-dimensional video coding (3VC) decoder configuration record to determine a width and a height of a depth view included in the track.

In some examples, parsing information further comprises parsing a View Identifier box from at least one of a sample entry and a multi-view group entry to determine at least one of whether a texture view or a depth view of a reference view is required for decoding at least one of the one or more views in the track, whether the track includes only depth views or texture and depth views, and, for each view included in the track, whether the view is a texture view or a depth view, wherein the at least one of the sample entry and the multi-view group entry are associated with the track. For example, decapsulation module 29 may parse information from View Identifier box 172 to determine, for each view included in the track, whether the view is a texture view or a depth view. Decapsulation module 29 may further parse View Identifier box 172 to determine whether a texture view or a depth view of a reference view is required for decoding a specific view in the track.

In examples wherein the video data is a first set of video data, and wherein the track further includes at least one texture view, decapsulation module 29 may further parse a second set of video data based on the first set of video data, wherein parsing information comprises parsing information to determine whether the first texture view, the first depth view, or both the first texture and first depth view of the first set of video data are used to decode the second set of video data.

In another example, the process includes parsing a supplemental enhancement information (SEI) message box to determine a three dimensional scalability information SEI message associated with one or more of the views. That is, decapsulation module 29 may parse an SEI message box, such as 3VC Scalability Information SEI Message box 166, to obtain information from an SEI message of one or more of the views.

In examples wherein the track is a first track containing a depth view, the process may further include parsing a second track of video data, wherein the second track includes a texture view corresponding to the depth view, wherein the texture view is not included in the first track. The process may further include parsing a track reference for the first track that references the second track, wherein the track reference includes at least one track reference type that indicates one of that the first track includes the depth view that is associated with the texture view stored in the second track (e.g., the track reference type is 'deps'), that one or more views the first track depends on a texture view stored in the second track (e.g., the track reference type is 'tref'), and that one or more views of the first track depends on a depth view stored in the second track (e.g., the track reference type is 'dref').

Other example processes of processing video data may include decoding a depth view and decoding a spatial resolution associated with the depth view, wherein decoding the spatial resolution does not require parsing of a sequence parameter set of the depth view. In another example, a process of processing video data includes decoding a depth resolution box to indicate a spatial resolution of depth views. In yet another example, a process of processing video data includes decoding a configuration box, wherein the depth resolution box is included in the configuration box. A further example process of processing video data includes decoding a 3VCDepthResolutionBox directly from a sample entry. In yet another example, a process of processing video data includes decoding a width and a height of depth views from a 3VC decoder configuration record, wherein 3VC stands for three-dimensional video coding. Any of these example processes may include any subset of the techniques described herein.

Figure 13:
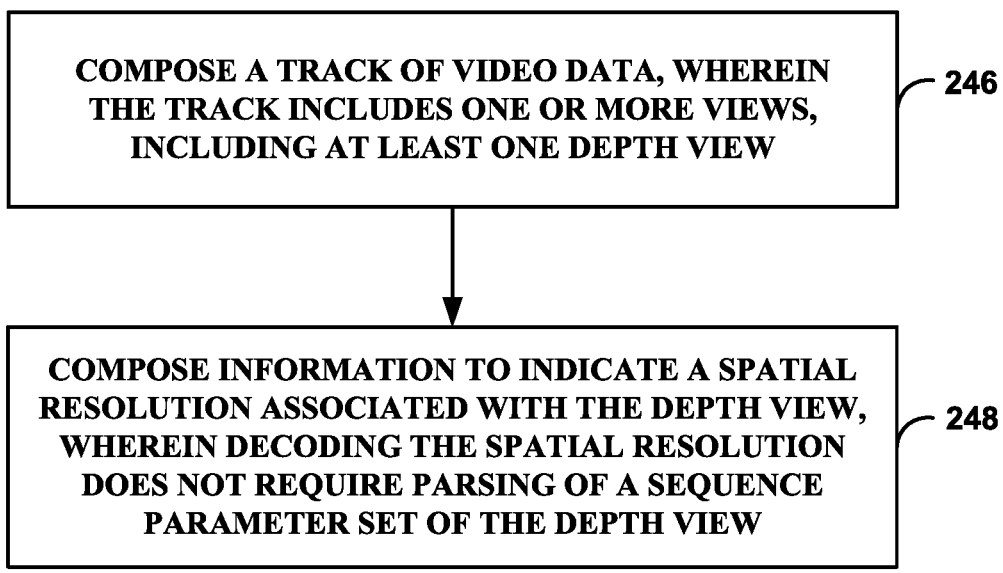
FIG. 13 is a flowchart illustrating an example method of composing a media file containing multiview video content to indicate a spatial resolution of a depth view according to techniques described in this disclosure.

FIG. 13 is a flowchart illustrating an example method of composing a media file containing multiview video content to indicate a spatial resolution of a depth view according to techniques described in this disclosure. The process described in FIG. 13 may be performed by a video coding device which includes encapsulation module 21 described herein. A video coding device may compose a track of video data, wherein the track includes one or more views, including at least one depth view (246). For example, encapsulation module 21 may obtain a video data from video encoder 21. The video coding device may compose information to indicate a spatial resolution associated with the depth view, wherein the spatial resolution does not require parsing of a sequence parameter set of the depth view (248). Encapsulation module 21 may compose a media file containing multiple coded views plus depth, such as multiview with depth media file 142, according to techniques described herein. For example, encapsulation module 21 may compose information into multiview with depth media file 142 to indicate a spatial resolution of a depth view in the track included in multiview with depth media file 142.

In some examples, composing information further comprises composing the spatial resolution in a 3VC Depth Resolution box in at least one of a 3VC Configuration Box and directly in a sample entry. That is, in some examples, a 3VC Depth Resolution box, such as 3VC Depth Resolution box 170, is stored in a 3VC Configuration box, such as 3VC Configuration box 168, while in other examples, 3VC Depth Resolution box 170 is stored directly in a sample entry. The process may further comprise composing a 3VC decoder configuration record in the 3VC Configuration box, wherein the 3VC Configuration box is included in at least one of a sample entry of type '3vc1' that allows extractors and a sample entry type '3vc2' that disallows extractors.

In some examples, encapsulation module 21 may also compose a 3VC decoder configuration record to indicate a width and a height of the depth view. 3VCDecoderConfigurationRecord may include semantics that indicate characteristics related to a 3DV video stream, such as an MVC+D video stream.

In some examples, composing information further comprises composing a View Identifier box from at least one of a sample entry and a multi-view group entry to indicate at least one of whether a texture view or a depth view of a reference view is required for decoding at least one of the one or more views in the track, whether the track includes only depth views or texture and depth views, and, for each view included in the track, whether the view is a texture view or a depth view, wherein the at least one of the sample entry and the multi-view group entry are associated with the track. For example, encapsulation module 21 may compose information in View Identifier box 172 to indicate, for each view included in the track, whether the view is a texture view or a depth view. Video decoder 30 may further compose View Identifier box 172 to indicate whether a texture view or a depth view of a reference view is required for decoding a specific view in the track.

In examples wherein the video data is a first set of video data, and wherein the track further includes at least one texture view, encapsulation module 21 may further compose a second set of video data based on the first set of video data, wherein parsing information comprises composing information to indicate whether the first texture view, the first depth view, or both the first texture and first depth view of the first set of video data are used to decode the second set of video data.

In another example, the process includes composing a supplemental enhancement information (SEI) message box to indicate a three dimensional scalability information SEI message associated with one or more of the views. That is, encapsulation module 21 may compose an SEI message box, such as 3VC Scalability Information SEI Message box 166, to store information from an SEI message of one or more of the views.

In examples wherein the track is a first track, the process may further include composing a second track of video data, wherein the second track includes a texture view corresponding to the depth view, wherein the texture view is not included in the first track. The process may further include composing a track reference for the first track that references the second track, wherein the track reference includes at least one track reference type that indicates one of that the first track includes the depth view that is associated with the texture view stored in the second track (e.g., the track reference type is 'deps'), that one or more views the first track depends on a texture view stored in the second track (e.g., the track reference type is 'tref'), and that one or more views of the first track depends on a depth view stored in the second track (e.g., the track reference type is 'dref').

Other example processes of processing video data may include encoding a depth view and encoding a spatial resolution associated with the depth view, wherein encoding the spatial resolution occurs such that parsing of a sequence parameter set of the depth view is not used to determine the spatial resolution. In another example, a process of processing video data includes encoding a depth resolution box to indicate a spatial resolution of depth views. In yet another example, a process of processing video data includes encoding a configuration box, wherein the depth resolution box is included in the configuration box. A further example process of processing video data includes encoding a 3VCDepthResolutionBox directly into a sample entry. In yet another example, a process of processing video data includes encoding a width and a height of depth views in a 3VC decoder configuration record, wherein 3VC stands for three-dimensional video coding. Any of these example processes may include any subset of the techniques described herein.

Figure 14:
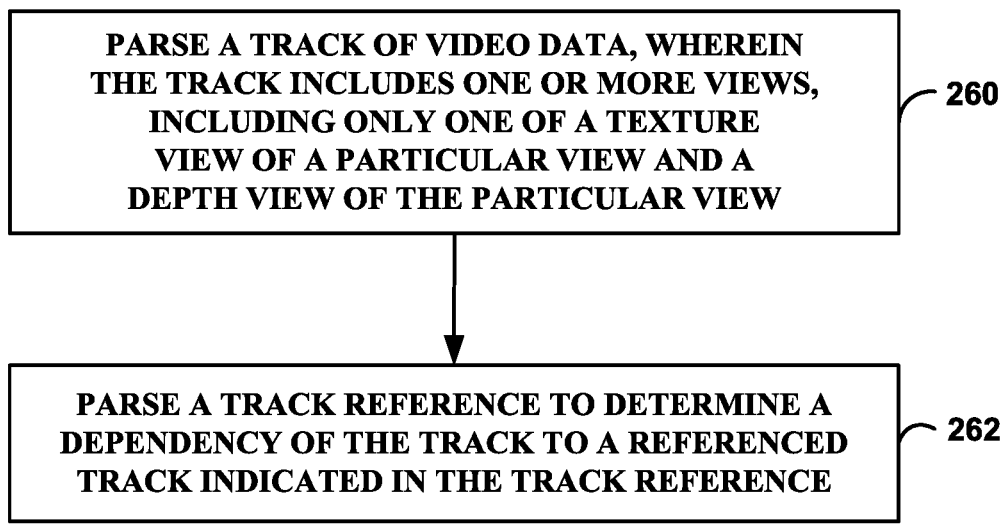
FIG. 14 is a flowchart illustrating an example method of parsing a media file containing multiview video wherein a texture and a depth view of a particular view are stored in separate tracks according to techniques described in this disclosure.

FIG. 14 is a flowchart illustrating an example method of parsing a media file containing multiview video wherein a texture and a depth view of a particular view are stored in separate tracks according to techniques described in this disclosure. The process described in FIG. 14 may be performed by a video coding device which include decapsulation module 29 described herein. A video coding device may parse a track of video data, wherein the track includes one or more views, including only one of a texture view of a particular view and a depth view of the particular view (260). For example, decapsulation module 29 may parse a media file, such as multiview with depth media file 142 from source device 12, which includes a texture view of a particular view and a depth view of the particular view stored in separate tracks.

The video coding device may parse a track reference to determine a dependency of the track to a referenced track indicated in the track reference (262). For example, decapsulation module 29 may parse a track reference type 'deps' that indicates that the track includes the depth view of the particular view and the reference track includes the texture view of the particular view. In another example, decapsulation module 29 may parse a track reference type 'tref' that indicates that the track depends on the texture view of the particular view which is stored in the referenced track. In yet another example, decapsulation module 29 may parse a track reference type 'dref' that indicates that the track depends on the depth view of the particular view which is stored in the referenced track.

In some examples, the method may further include parsing a view identifier box from at least one of a sample entry and a multi-view group entry to determine, for each view in the track, whether the view is a texture view or a depth view, wherein the at least one of the sample entry and the multi-view group entry are associated with the track. In another example, view identifier box may be parsed to determine whether a texture view or a depth view of a reference view is required for decoding a specific view in the track.

In another example, the process includes parsing a supplemental enhancement information (SEI) message box to determine a three dimensional scalability information SEI message associated with one or more of the views. In examples where the track contains the depth view of the particular view, the method may further include parsing a 3VC Depth Resolution box to determine a spatial resolution the depth view of the particular view. In another example where the track contains the depth view of the particular view, the method comprises parsing a three-dimensional video coding (3VC) decoder configuration record to determine a width and a height of the depth view of the particular view.

In yet another example wherein the track is a three-dimensional video coding (3VC) track, the method may further include parsing a 3VC decoder configuration record, wherein the 3VC decoder configuration record indicates a configuration record for a matching sample entry of the video data.

In another example method of processing video data, the method includes decoding a type value 'tref' for a track to determine that the track depends on a texture view stored in a referenced track. In another example method of processing video data, the method includes decoding a type value 'dref' for a track to determine that the track depends on a depth view stored in a referenced track. In further examples, any of the processes described herein may contain one or more of the techniques described in this disclosure.

Figure 15:
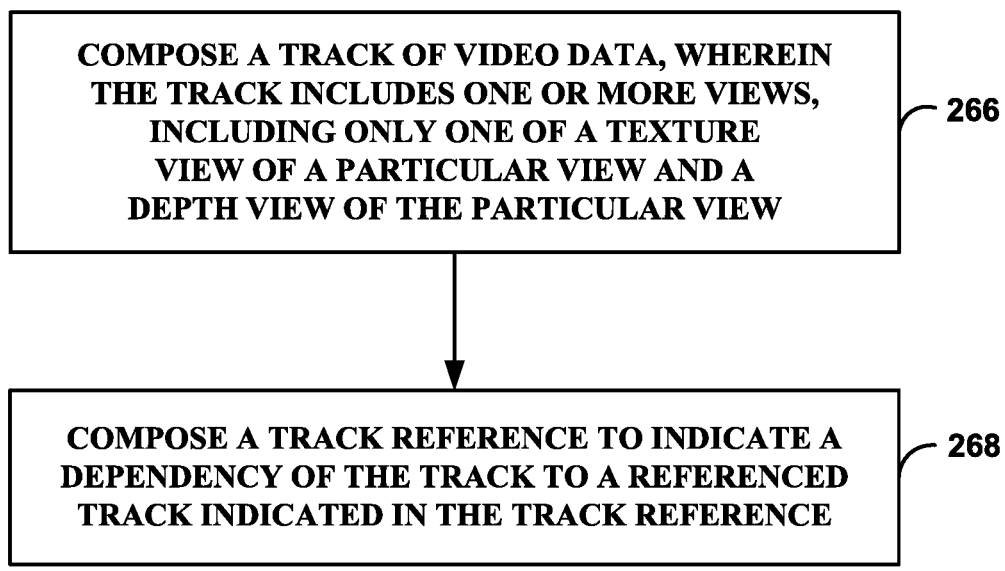
FIG. 15 is a flowchart illustrating an example method of composing a media file containing multiview video content wherein a texture and a depth view of a particular view are stored in separate tracks according to techniques described in this disclosure.

FIG. 15 is a flowchart illustrating an example method of composing a media file containing multiview video content wherein a texture and a depth view of a particular view are stored in separate tracks according to techniques described in this disclosure. The process described in FIG. 15 may be performed by a video coding device which includes encapsulation module 21 described herein. A video coding device may a track of video data, wherein the track includes one or more views, including only one of a texture view of a particular view and a depth view of the particular view (266). For example, encapsulation module 21 may compose a media file, such as multiview with depth media file 142, which includes a texture view of a particular view and a depth view of the particular view stored in separate tracks.

The video coding device may compose a track a track reference to indicate a dependency of the track to a referenced track indicated in the track reference (266). For example, encapsulation module 21 may compose a track reference type 'deps' that indicates that the track includes the depth view of the particular view and the reference track includes the texture view of the particular view. In another example, encapsulation module 21 may compose a track reference type 'tref' that indicates that the track depends on the texture view of the particular view which is stored in the referenced track. In yet another example, encapsulation module 21 may compose a track reference type 'dref' that indicates that the track depends on the depth view of the particular view which is stored in the referenced track.

In some examples, the method may further include composing a view identifier box from at least one of a sample entry and a multi-view group entry to indicate, for each view in the track, whether the view is a texture view or a depth view, wherein the at least one of the sample entry and the multi-view group entry are associated with the track. In another example, view identifier box may be composed to indicate whether a texture view or a depth view of a reference view is required for decoding a specific view in the track.

In another example, the process includes composing a supplemental enhancement information (SEI) message box to indicate a three dimensional scalability information SEI message associated with one or more of the views. In examples where the track contains the depth view of the particular view, the method may further include composing a 3VC Depth Resolution box to indicate a spatial resolution the depth view of the particular view. In another example where the track contains the depth view of the particular view, the method includes composing a three-dimensional video coding (3VC) decoder configuration record to indicate a width and a height of the depth view of the particular view.

In yet another example wherein the track is a three-dimensional video coding (3VC) track, the method may further include composing a 3VC decoder configuration record, wherein the 3VC decoder configuration record indicates a configuration record for a matching sample entry of the video data.

In another example method of processing video data, the method includes storing a texture view and a depth view of a particular view in separate tracks. In another example method of processing video data, the method includes encoding a type value 'tref' for a track to indicate that the track depends on a texture view stored in a referenced track. In another example method of processing video data, the method includes encoding a type value 'dref' for a track to indicate that the track depends on a depth view stored in a referenced track. In further examples, any of the processes described herein may contain one or more of the techniques described in this disclosure.

In another example, a method of processing video data includes decoding a decoder configuration record, wherein the decoder configuration record is defined as "3VCDecoderConfigurationRecord" including a same syntax structure as "MVCDecoderConfigurationRecord" and at least some different semantics than the "MVCDecoderConfigurationRecord" to indicate characteristics related to a 3VC video steam.

In yet another example, a method of processing video data includes decoding a sample entry type for 3VC tracks with depth NAL units only, wherein the entry type is selected from a group that includes a first type where extractors are not allowed and a second type where extractors are allowed.

In another example, a method of processing video data includes decoding a sample entry type from a group of sample entry types that includes: 1) sample entry type 'avc1' containing AVC, MVC and 3VC configurations, for 3VC tracks with AVC, MVC and depth NAL units; 2) sample entry type 'mvc1' containing MVC and 3VC configurations, for 3VC tracks without AVC NAL units but with MVC and depth NAL units where extractors are not allowed; and 3) sample entry type 'mvc2' containing MVC and 3VC configurations, for 3VC tracks without AVC NAL units but with MVC and depth NAL units where extractors are allowed.

In another example, a method of processing video data includes decoding an attribute to indicate at least one of: whether 3VC operation points indicated in a Multiview Group Box are present, whether an operation point indicated in a Multiview Group Box is 3VC or MVC, and whether output views indicated in a Multiview Group Box contain texture only, depth only, or both.

In a further example, a method of processing video data includes decoding an SEI message box that contains a three dimensional scalability information SEI message defined in an MVC+D codec specification. In another example, a method of processing video data includes decoding a compressor name value of "/0123VC Coding" for a file containing a three-dimensional video coding (3VC) video stream.

In another example, a method of processing video data includes encoding a decoder configuration record, wherein the decoder configuration record is defined as "3VCDecoderConfigurationRecord" including a same syntax structure as "MVCDecoderConfigurationRecord" and at least some different semantics than the "MVCDecoderConfigurationRecord" to indicate characteristics related to a three-dimensional video coding (3VC) video steam. In yet another example, a method of processing video data includes encoding a sample entry type for 3VC tracks with depth NAL units only, wherein the entry type is selected from a group that includes a first type where extractors are not allowed and a second type where extractors are allowed, wherein NAL stands for network abstraction layer and 3VC stands for three-dimensional video coding.

In yet another example, a method of processing video data includes encoding a sample entry type from a group of sample entry types that includes: 1) sample entry type 'avc1' containing AVC, MVC and 3VC configurations, for 3VC tracks with AVC, MVC and depth NAL units; 2) sample entry type 'mvc1' containing MVC and 3VC configurations, for 3VC tracks without AVC NAL units but with MVC and depth NAL units where extractors are not allowed; and 3) sample entry type 'mvc2' containing MVC and 3VC configurations, for 3VC tracks without AVC NAL units but with MVC and depth NAL units where extractors are allowed.

In another example, a method of processing video data includes encoding an attribute to indicate at least one of: whether 3VC operation points indicated in a Multiview Group Box are present, whether an operation point indicated in a Multiview Group Box is 3VC or MVC, and whether output views indicated in a Multiview Group Box contain texture only, depth only, or both. In some examples, the attribute is one of a common attribute or differentiating attribute.

In another example, a method of processing video data includes encoding a supplemental enhancement information (SEI) message box that contains a three dimensional scalability information SEI message defined in a multi-view coding plus depth (MVC+D) codec specification. In another example, a method of processing video data includes encoding a compressor name value of "/0123VC Coding" for a file containing a three-dimensional video coding (3VC) video stream.

This disclosure also includes the following attachment, which is based on the latest integrated specification of 14496-15 in MPEG output document W13036, the entire content of which is incorporated herein by reference. In the following attachment, unchanged portions are not generally shown, but are replaced with the statement "[See Original Document]" within the attachment. The original specification of 14496-15 in MPEG output document W13036 is copyrighted by ISO/IEC.

The techniques of this disclosure may be implemented by network devices such routing devices 104 and transcoding device 106, but also may be implemented by client device 108. In this manner, routing devices 104, transcoding device 106, and client device 108 represent examples of devices configured to perform the techniques of this disclosure, including techniques recited in the CLAIMS portion of this disclosure. Moreover, the devices of FIG. 1, and encoder shown in FIG. 2 and the decoder shown in FIG. 3 are also exemplary devices that can be configured to perform the techniques of this disclosure, including techniques recited in the CLAIMS portion of this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

In still other examples, this disclosure contemplates a computer readable medium comprising a data structure stored thereon, wherein the data structure includes comprise encoded bitstream that is coded consistent with this disclosure.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
   parsing a track of multiview video data, wherein the track includes at least one depth view; and
   parsing a depth resolution box from a configuration box within a sample entry to determine a spatial resolution associated with the depth view, wherein the sample entry comprises at least a first sample entry that allows extractors.

2. The method of claim 1, wherein the sample entry further comprises at least a second sample entry type that disallows extractors.

3. The method of claim 1, further comprising:
   parsing a view identifier box from at least one of a sample entry and a multi-view group entry to determine at least one of whether a texture view or a depth view of a reference view is required for decoding at least one of the one or more views in the track, whether the track includes only depth views or texture and depth views, and, for each view included in the track, whether the view is a texture view or a depth view, wherein the at least one of the sample entry and the multi-view group entry are associated with the track.

4. The method of claim 1, wherein the multiview video data is a first set of multiview video data, and wherein the track further includes at least one texture view, the method further comprising:
   parsing a second set of multiview video data based on the first set of multiview video data, wherein parsing information comprises parsing information to determine whether the first texture view, the first depth view, or both the first texture and first depth view of the first set of multiview video data are needed to decode the second set of multiview video data.

5. The method of claim 1, further comprising:
   parsing a supplemental enhancement information (SEI) message box to determine a scalability information SEI message associated with one or more of the views.

6. The method of claim 1, further comprising:
   parsing a decoder configuration record to determine a width and a height of the depth view.

7. The method of claim 1, wherein the track is a first track, the method further comprising:
   parsing a second track of multiview video data, wherein the second track includes a texture view corresponding to the depth view, wherein the texture view is not included in the first track.

8. The method of claim 1, further comprising:
   generating decapsulated data for the at least one depth view of the track of multiview data and the determined spatial resolution associated with the depth view.

9. The method of claim 1, further comprising:
   parsing a scalability information supplemental enhancement information (SEI) Message box within the sample entry, the scalability information SEI Message box comprising only a view scalability information SEI message.

10. The method of claim 1, further comprising:
    determining the spatial resolution associated with the depth view based on parsing the depth resolution box from the configuration box within the sample entry.

11. A device comprising:
    a memory configured to store video data; and
    one or more processors configured to:
       parse a track of multiview video data, wherein the track includes one or more views, including at least one depth view; and
       parse a depth resolution box from a configuration box within a sample entry to determine a spatial resolution associated with the depth view, wherein the sample entry comprises at least a first sample entry that allows extractors.

12. The device of claim 11, wherein the sample entry comprises at least and a second sample entry type that disallows extractors.

13. The device of claim 11, the device further configured to:
    parse a view identifier box from at least one of a sample entry and a multi-view group entry to determine at least one of whether a texture view or a depth view of a reference view is required for decoding at least one of the one or more views in the track, whether the track includes only depth views or texture and depth views, and, for each view included in the track, whether the view is a texture view or a depth view, wherein the at least one of the sample entry and the multi-view group entry are associated with the track.

14. The device of claim 11, wherein the multiview video data is a first set of multiview video data, and wherein the track further includes at least one texture view, the device further configured to:
    parse a second set of multiview video data based on the first set of multiview video data, wherein parsing information comprises parsing information to determine whether the first texture view, the first depth view, or both the first texture and first depth view of the first set of multiview video data are needed to decode the second set of multiview video data.

15. The device of claim 11, further configured to:
    parse a supplemental enhancement information (SEI) message box to determine a scalability information SEI message associated with one or more of the views.

16. The device of claim 11, further configured to:
    parse a decoder configuration record to determine a width and a height of the depth view.

17. The device of claim 11, wherein the track is a first track, the device further configured to:
    parse a second track of multiview video data, wherein the second track includes a texture view corresponding to the depth view, wherein the texture view is not included in the first track.

18. The device of claim 11, the device further configured to:
    generate decapsulated data for the at least one depth view of the track of multiview data and the determined spatial resolution associated with the depth view.

19. A non-transitory computer-readable storage medium having instructions stored thereon that upon execution cause one or more processors of a video coding device to:
- parse a track of multiview video data, wherein the track includes one or more views, including at least one depth view; and
- parse a depth resolution box from a configuration box within a sample entry to determine a spatial resolution associated with the depth view, wherein the sample entry comprises at least a first sample entry that allows extractors.

20. The non-transitory computer-readable storage medium of claim 19, wherein the sample entry comprises at least a second sample entry type that disallows extractors.

21. The non-transitory computer-readable storage medium of claim 19, the instructions stored thereon further cause the one or more processors of the video coding device to:
- generate decapsulated data for the at least one depth view of the track of multiview data and the determined spatial resolution associated with the depth view.

22. An apparatus configured to parse a video file including coded video content, the apparatus comprising:
- means for parsing a track of multiview video data, wherein the track includes one or more views, including at least one depth view; and
- means for parsing a depth resolution box from a configuration box within a sample entry to determine a spatial resolution associated with the depth view, wherein the sample entry comprises at least a first sample entry that allows extractors.

23. The apparatus of claim 22, wherein the sample entry comprises at least a second sample entry type that disallows extractors.

24. The apparatus of claim 22, further comprising:
- means for generating decapsulated data for the at least one depth view of the track of multiview data and the determined spatial resolution associated with the depth view.

25. A method of processing video data, the method comprising:
- composing a track of multiview video data, wherein the track includes the one or more views; and
- composing a depth resolution box from a configuration box within a sample entry to indicate a spatial resolution associated with the depth view, wherein the sample entry comprises at least a first sample entry that allows extractors.

26. The method of claim 25, wherein the sample entry comprises at least a second sample entry type that disallows extractors.

27. The method of claim 25, further comprising:
- composing a view identifier box from at least one of a sample entry and a multi-view group entry to indicate at least one of whether a texture view or a depth view of a reference view is required for decoding at least one of the one or more views in the track, whether the track includes only depth views or texture and depth views, and, for each view included in the track, whether the view is a texture view or a depth view, wherein the at least one of the sample entry and the multi-view group entry are associated with the track.

28. The method of claim 25, wherein the multiview video data is a first set of multiview video data, and wherein the track further includes at least one texture view, the method further comprising:
- composing a second set of multiview video data based on the first set of multiview video data, wherein composing information further comprises composing information to indicate whether the first texture view, the first depth view, or both the first texture and first depth view of the first set of multiview video data are needed to decode the second set of multiview video data.

29. The method of claim 25, further comprising:
- composing a supplemental enhancement information (SEI) message box to indicate a scalability information SEI message associated with one or more of the views.

30. The method of claim 25, further comprising:
- composing a decoder configuration record to indicate a width and a height of the depth view.

31. The method of claim 25, wherein the track is a first track, the method further comprising:
- composing a second track of multiview video data, wherein the second track includes a texture view corresponding to the depth view, wherein the texture view is not included in the first track.

32. The method of claim 25, further comprising:
- generating encapsulated data for the at least one depth view of the track of multiview data and the determined spatial resolution associated with the depth view.

33. A device comprising:
a memory configured to store video data; and
one or more processors configured to:
- compose a track of multiview video data, wherein the track includes one or more views, including at least one depth view; and
- compose a depth resolution box from a configuration box within a sample entry to indicate a spatial resolution associated with the depth view, wherein the sample entry comprises at least a first sample entry that allows extractors.

34. The device of claim 33, wherein the sample entry comprises at least a second sample entry type that disallows extractors.

35. The device of claim 33, the device further configured to:
- compose a view identifier box from at least one of a sample entry and a multi-view group entry to indicate at least one of whether a texture view or a depth view of a reference view is required for decoding at least one of the one or more views in the track, whether the track includes only depth views or texture and depth views, and, for each view included in the track, whether the view is a texture view or a depth view, wherein the at least one of the sample entry and the multi-view group entry are associated with the track.

36. The device of claim 33, wherein the multiview video data is a first set of multiview video data, and wherein the track further includes at least one texture view, the device further configured to:
- compose a second set of multiview video data based on the first set of multiview video data, wherein composing information further comprises composing information to indicate whether the first texture view, the first depth view, or both the first texture and first depth view of the first set of multiview video data are needed to decode the second set of multiview video data.

37. The device of claim 33, further configured to:
- compose a supplemental enhancement information (SEI) message box to indicate a scalability information SEI message associated with one or more of the views.

38. The device of claim 33, further configured to:
compose a decoder configuration record to indicate a width and a height of the depth view.

39. The device of claim 33, wherein the track is a first track, the device further configured to:
compose a second track of multiview video data, wherein the second track includes a texture view corresponding to the depth view, wherein the texture view is not included in the first track.

40. The device of claim 33, the device further configured to:
generate encapsulated data for the at least one depth view of the track of multiview data and the determined spatial resolution associated with the depth view.

41. A non-transitory computer-readable storage medium having instructions stored thereon that upon execution cause one or more processors of a video coding device to:
compose a track of multiview video data, wherein the track includes one or more views, including at least one depth view; and
compose a depth resolution box from a configuration box within a sample entry to indicate a spatial resolution associated with the depth view, wherein the sample entry comprises at least a first sample entry that allows extractors.

42. The non-transitory computer-readable storage medium of claim 41, wherein the sample entry comprises at least a second sample entry type '3vc2' that disallows extractors.

43. The non-transitory computer-readable storage medium of claim 41, the instructions stored thereon further cause the one or more processors of the video coding device to:
generate encapsulated data for the at least one depth view of the track of multiview data and the determined spatial resolution associated with the depth view.

44. An apparatus configured to compose a video file including coded video content, the apparatus comprising:
means for composing a track of multiview video data, wherein the track includes one or more views, including at least one depth view; and
means for composing a depth resolution box from a configuration box within a sample entry to indicate a spatial resolution associated with the depth view, wherein the sample entry comprises at least a first sample entry that allows extractors.

45. The apparatus of claim 44, wherein the sample entry comprises at least a second sample entry type that disallows extractors.

46. The apparatus of claim 44, further comprising:
means for generating encapsulated data for the at least one depth view of the track of multiview data and the determined spatial resolution associated with the depth view.

* * * * *